(12) United States Patent (10) Patent No.: US 8,107,110 B2
Lapstun et al. (45) Date of Patent: Jan. 31, 2012

(54) COMPUTER SYSTEM FOR PRINTING A PAGE AND GENERATING INTERACTIVE ELEMENTS

(75) Inventors: Paul Lapstun, Balmain (AU); Andrew Timothy Robert Newman, Balmain (AU); Michael Hollins, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 859 days.

(21) Appl. No.: 12/178,639

(22) Filed: Jul. 24, 2008

(65) Prior Publication Data

US 2009/0080016 A1 Mar. 26, 2009

Related U.S. Application Data

(60) Provisional application No. 60/974,077, filed on Sep. 21, 2007.

(51) Int. Cl.
*G06F 15/00* (2006.01)
*G06F 3/00* (2006.01)
(52) U.S. Cl. ...................................... 358/1.15; 715/744
(58) Field of Classification Search .................. 358/1.15, 358/1.16, 1.14, 1.13, 1.18, 1.1; 715/744, 715/234; 709/229, 227, 223, 224, 230
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |
| 5,652,412 A | 7/1997 | Lazzouni et al. | |
| 5,661,506 A | 8/1997 | Lazzouni et al. | |
| 5,692,073 A | 11/1997 | Cass | |
| 5,852,434 A | 12/1998 | Sekendur | |
| 6,076,734 A | 6/2000 | Dougherty et al. | |
| 6,529,214 B1 * | 3/2003 | Chase et al. | 715/744 |
| 6,964,374 B1 | 11/2005 | Djuknic et al. | |
| 7,405,838 B2 * | 7/2008 | Ueda et al. | 358/1.15 |

FOREIGN PATENT DOCUMENTS

| | | |
|---|---|---|
| GB | 2306669 A | 5/1997 |
| WO | WO 99/18487 A2 | 4/1999 |
| WO | WO 99/50787 A1 | 10/1999 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner* — Saeid Ebrahimi Dehkordy

(57) ABSTRACT

A computer system for printing a page at a printer. The computer system is configured to: (i) receive a visual description for the page, the visual description describing a graphic impression for printing; (ii) identify a URI text string in the visual description; (iii) generate a corresponding input description for the visual description, the input description describing a URI corresponding to the URI text string and a spatial extent of the URI text string on the page; and (iv) archive the visual description and the corresponding input description.

13 Claims, 20 Drawing Sheets

COMPUTER SYSTEM FOR PRINTING A PAGE AND GENERATING INTERACTIVE ELEMENTS

CROSS-REFERENCE TO RELATED PATENT APPLICATIONS

The present application claims the right of priority under 35 U.S.C. §119(e) based on U.S. Provisional Patent Application No. 60/974,077, filed Sep. 21, 2007 which is incorporated by reference herein in its entirety as if fully set forth herein.

FIELD OF INVENTION

The present invention relates to a printer driver for printing a position-coding pattern on a surface.

CO-PENDING APPLICATIONS

The following applications have been filed by the Applicant simultaneously with the present application:

| | | | | |
|---|---|---|---|---|
| NPT087US | NPT088US | NPT089US | NPT090US | NPT092US |
| NPT093US | NPT094US | NPT095US | NPT096US | NPT097US |
| NPS151US | NPP090US | NPP091US | NPP092US | NPP093US |
| NPP094US | NPP095US | NPP096US | NPP097US | NPS149US |
| NPS150US | NPZZ032US | NPZ033US | NPP099US | NPP101US |
| NPP102US | NPP103US | NPP104US | NPP105US | NPP106US |
| NPP107US | NPP108US | | | |

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | |
|---|---|---|---|---|---|
| 10/815,621 | 10/815,635 | 10/815,647 | 11/488,162 | 10/815,636 | 11/041,652 |
| 11/041,609 | 11/041,556 | 10/815,609 | 7,204,941 | 7,278,727 | 10/913,380 |
| 7,122,076 | 7,156,289 | 09/575,197 | 6,720,985 | 7,295,839 | 09/722,174 |
| 7,068,382 | 7,094,910 | 7,062,651 | 6,644,642 | 6,549,935 | 6,987,573 |
| 6,727,996 | 6,760,119 | 7,064,851 | 6,290,349 | 6,428,155 | 6,785,016 |
| 6,831,682 | 6,741,871 | 6,965,439 | 10/932,044 | 6,870,966 | 6,474,888 |
| 6,724,374 | 6,788,982 | 7,263,270 | 6,788,293 | 6,737,591 | 09/693,514 |
| 10/778,056 | 10/778,061 | 11/193,482 | 7,055,739 | 6,830,196 | 7,182,247 |
| 7,082,562 | 10/409,864 | 7,108,192 | 10/492,169 | 10/492,152 | 10/492,168 |
| 10/492,161 | 7,308,148 | 6,957,768 | 7,170,499 | 11,856,061 | 11/672,522 |
| 11/672,950 | 11,754,310 | 12,015,507 | 7,148,345 | 12,025,746 | 12,025,762 |
| 12,025,765 | 10/407,212 | 6,902,255 | 6,755,509 | | |

BACKGROUND

The Applicant has previously described a system enabling users to access information from a computer system via a printed substrate e.g. paper. This system has been termed a Netpage system by the Applicant. In the Netpage system, the substrate has a coding pattern printed thereon, which is read by an optical sensing device when the user interacts with the substrate using the sensing device. A computer receives interaction data from the sensing device and uses this data to determine what action is being requested by the user. For example, a user may make make handwritten input onto a form or make a selection gesture around a printed item. This input is interpreted by the computer system with reference to a page description corresponding to the printed substrate.

It would be desirable to print Netpage-enabled substrates even if a source document is Netpage-unaware, in the sense that the document was generated without the intention of being printed with a position-coding pattern and being made interactive.

SUMMARY OF INVENTION

In a first aspect the present invention provides a printer driver for printing a document at a printer, wherein said printer driver is configured to:
  receive a visual description for said document from a first memory, said visual description describing a graphic impression for printing;
  send print data corresponding to said graphic impression to said printer; and
  archive the visual description for at least one page of the document in a second memory, wherein said first and second memories are different from each other.

Optionally, said visual description is archived on a server.

Optionally, the printer driver is configured to receive an impression identity from the server.

Optionally, the printer driver is configured to receive a block of impression identities and allocate one of said impression identities to said at least one page or said document.

Optionally, the printer driver is configured to print a tag pattern on the at least one page, wherein the tag pattern identifies an impression identity, and wherein the visual description is indexed by the impression identity.

Optionally, the tag pattern is a position-coding pattern identifying the impression identity and a plurality of locations on said page.

Optionally, said printer driver is configured to archive an input description for said page together with said visual description, said input description describing at least one interactive element on said page.

Optionally, the printer driver is configured to allow an application to specify the interactive element in the input description, wherein said interactive element is specified by at least one of:
  a spatial extent and URI of a hyperlink on the page; and
  a spatial extent and type of an input field on the page.

Optionally, the printer driver is configured to allow an application to specify the input element via any one of:
  a pass-through channel;
  a PDL;
  a PDF annotation; and
  a Postscript pdfmark operator.

Optionally, said pass-through channel is provided by a GDI escape mechanism.

Optionally, the printer driver is configured to allow an application to specify at least some metadata selected from the group comprising:
  a path of a source document for the printed document;
  a creator of the document;
  a creation date and time of the document; and
  a modification date and time of the document.

Optionally, the printer driver is configured to archive said metadata with said visual description.

Optionally, the printer driver is configured to identify a URI text string in the visual description and generate a corresponding interactive element in the input description.

Optionally, the printer driver is configured to alter the visual description of the URI text string when it is identified as a URI.

Optionally, the server is configured to identify a URI text string in the visual description and generate a corresponding interactive element in an input description for said page, said input description being archived with said visual description.

Optionally, the server identifies the URI text string when processing a user interaction with a corresponding printed impression.

In a second aspect the present invention provides a computer system for printing a page at a printer, wherein said computer system is configured to:
  receive a visual description for said page, said visual description describing a graphic impression for printing;
  identify a URI text string in the visual description;
  generate a corresponding input description for said visual description, said input description describing a URI corresponding to the URI text string and a spatial extent of the URI text string on the page; and
  archive the visual description and the corresponding input description.

Optionally, said visual description and said input description are archived on a server.

Optionally, the computer system is configured to print a tag pattern on the page, wherein the tag pattern comprises an impression identity.

Optionally, the visual description and input description are indexed by the impression identity.

Optionally, the tag pattern is a position-coding pattern identifying a plurality of locations on said page.

Optionally, the computer system is configured to alter the visual description of the URI text string when it is identified as a URI.

Optionally, the computer system is selected from the group comprising:
  a printer driver;
  a server; and
  a server in communication with a printer driver running on a client.

In another aspect the present invention provides a method of printing a page at a printer, said method comprising the steps of:
  receiving a visual description for said page, said visual description describing a graphic impression for printing;
  identifying a URI text string in the visual description;
  generating a corresponding input description for said visual description, said input description describing the URI and spatial extent of the URI text string on the page;
  archiving the visual description and the corresponding input description; and
  printing the graphic impression,
wherein said graphic impression is superimposed with a position-coding pattern on the page.

Optionally, said position-coding pattern is pre-printed on a substrate.

Optionally, said position-coding pattern is printed by the printer substantially simultaneously with said graphic impression.

Optionally, said position-coding pattern identifies a plurality of locations on said page and an impression identity.

Optionally, said visual description and said input description are indexed by said impression identity.

Optionally, said visual description and said input description are archived on a server.

Optionally, the method further comprising the step of altering the visual description of the URI text string when it is identified as a URI.

In a third aspect the present invention provides a printer driver for printing a page at a printer, wherein said printer driver is configured to:
  receive a visual description for said page, said visual description describing a graphic impression for printing;
  send print data corresponding to said graphic impression to said printer; and
  receive a physical impression identity from said printer, wherein said physical impression identity is encoded in a tag pattern disposed on the page printed by the printer.

Optionally, the tag pattern is a position-coding pattern identifying the physical impression identity and a plurality of locations.

Optionally, said printer allocates the physical impression identity and prints the tag pattern.

Optionally, said printer has a plurality of physical impression identities stored in a printer memory.

Optionally, the tag pattern is pre-printed on a print substrate, and said printer reads the physical impression identity from said substrate.

Optionally, the printer driver is further configured to report the physical impression identity to a server.

Optionally, the printer driver is further configured to:
  report a virtual impression identity to the server, said virtual impression identity being allocated to said page prior to printing.

Optionally, the virtual impression identity is indexed to said visual description.

Optionally, said virtual impression identity is further indexed to at least one of:
  an input description for said page; and
  at least some metadata of the page.

Optionally, said input description describes a type and spatial extent of at least one interactive element on said page.

Optionally, said at least some metadata is selected from the group comprising:
  a path of a source document for the printed document;
  a creator of the document;
  a creation date and time of the document; and
  a modification date and time of the document.

BRIEF DESCRIPTION OF DRAWINGS

Preferred and other embodiments of the invention will now be described, by way of non-limiting example only, with reference to the accompanying drawings, in which.

DETAILED DESCRIPTION OF PREFERRED AND OTHER EMBODIMENTS

1. Netpage System Overview 1.1 Netpage System Architecture

The present invention is used in connection with the Applicant's netpage system, which has been described in detail in the cross-referenced patent applications identified above.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device ("reader") and transmitted to the netpage system. The sensing device may take the form of, for example, a clicker (for clicking on a specific position on a surface), a pointer having a stylus (for pointing or gesturing on a surface using pointer strokes), or a pen having a marking nib (for marking a surface with ink when pointing, gesturing or writing on the surface). Any references herein to "pen" or "netpage pen" are provided by way of example only. It will, of course, be appreciated that the netpage pen may take the form of any suitable optically imaging sensing device or reader.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 1:
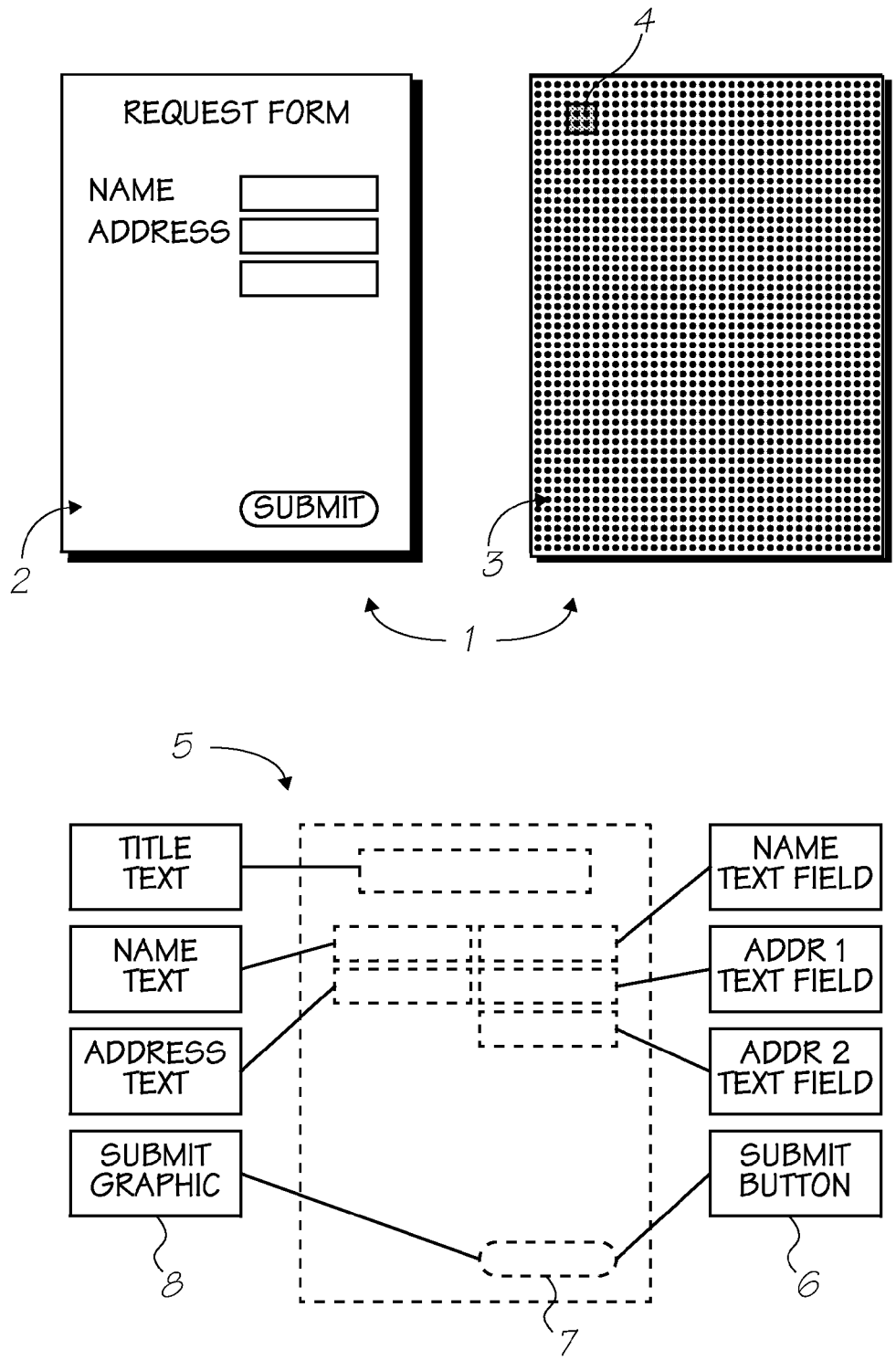
FIG. 1 is a schematic of a the relationship between a sample printed netpage and its online page description.

As illustrated in FIG. 1, a printed netpage 1 can represent an interactive form which can be filled in by the user both physically, on the printed page, and "electronically", via communication between the pen and the netpage system. The example shows a "Request" form containing name and address fields and a submit button. The netpage 1 consists of a graphic impression 2, printed using visible ink, and a surface coding pattern 3 superimposed with the graphic impression. The coding pattern 3 is typically printed with an infrared ink and the superimposed graphic impression 2 is printed with colored ink(s) having a complementary infrared window, allowing infrared imaging of the coding pattern 3.

The surface coding pattern 3 typically takes the form of a grid of target dots, which comprises a collection of tags 4. One such tag 4 is shown in the shaded region of FIG. 1, although it will be appreciated that contiguous tags 4, defined by the coding pattern 3, are densely tiled over the whole netpage 1.

A corresponding page description 5, stored on the netpage network, describes the individual elements of the netpage. In particular it has an input description describing the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
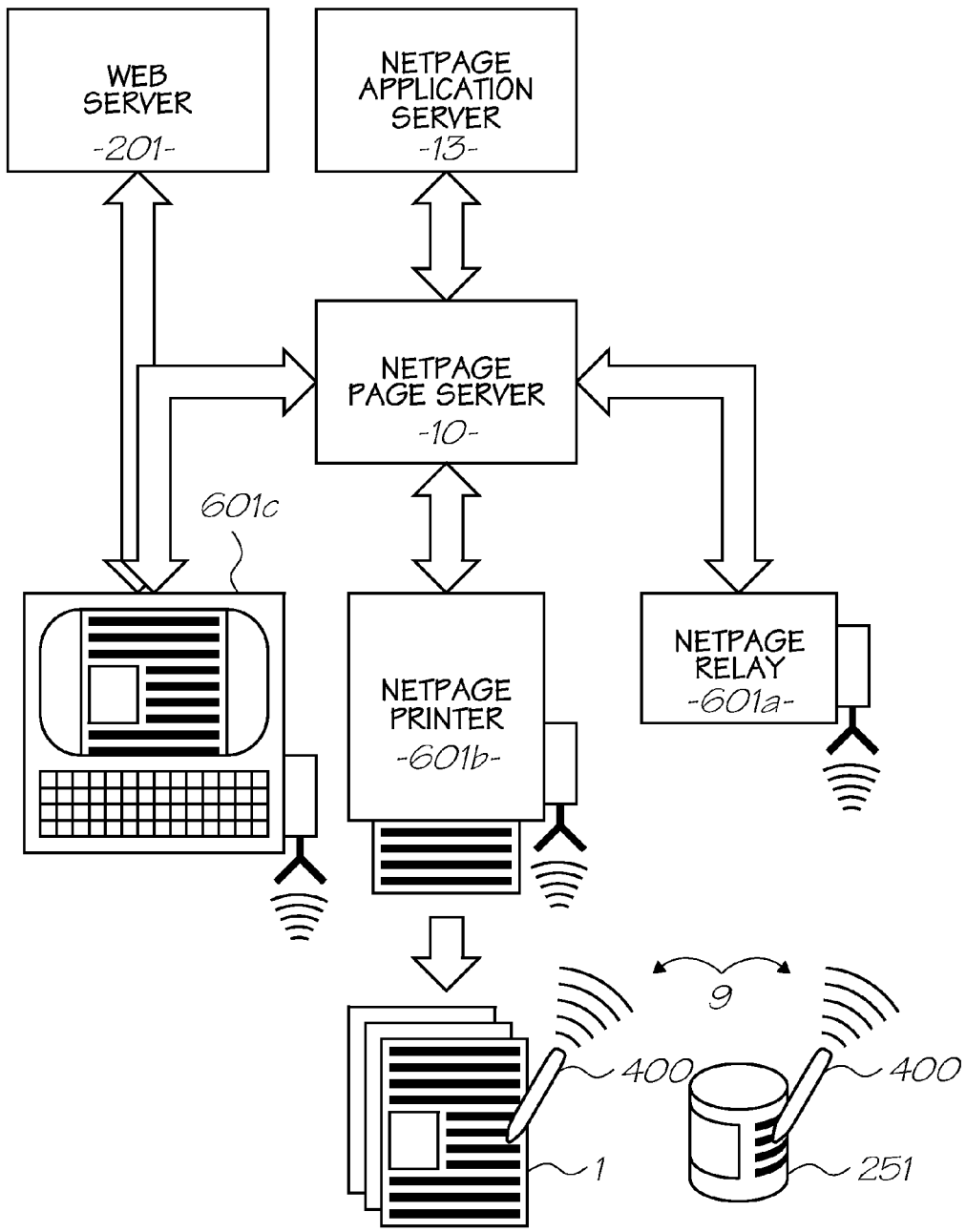
FIG. 2 shows an embodiment of basic netpage architecture with various alternatives for the relay device.

As illustrated in FIG. 2, a netpage reader 400 (e.g. netpage pen) works in conjunction with a netpage relay device 601, which is an Internet-connected device for home, office or mobile use. The reader 400 is wireless and communicates securely with the netpage relay device 601 via a short-range radio link 9. In an alternative embodiment, the reader 400 utilizes a wired connection, such as a USB or other serial connection, to the relay device 601.

The relay device 601 performs the basic function of relaying interaction data to a page server 10, which interprets the interaction data. As shown in FIG. 2, the relay device 601 may, for example, take the form of a personal computer 601a, a netpage printer 601b or some other relay 601c (e.g. personal computer or mobile phone incorporating a web browser).

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601*b* which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing. As will be explained in more detail below, the present invention provides an alternative means which enables users conveniently to generate netpages, as well as scan or print images.

As shown in FIG. 2, the netpage reader 400 interacts with a portion of the position-coding tag pattern on a printed netpage 1, or other printed substrate such as a label of a product item 251, and communicates, via a short-range radio link 9, the interaction to the relay device 601. The relay 601 sends corresponding interaction data to the relevant netpage page server 10 for interpretation. Raw data received from the netpage reader 400 may be relayed directly to the page server 10 as interaction data. Alternatively, the interaction data may be encoded in the form of an interaction URI and transmitted to the page server 10 via a user's web browser 601*c*. The web browser 601*c* may then receive a URI from the page server 10 and access a webpage via a webserver 201. In some circumstances, the page server 10 may access application computer software running on a netpage application server 13.

The netpage relay device 601 can be configured to support any number of readers 400, and a reader can work with any number of netpage relays. In the preferred implementation, each netpage reader 400 has a unique identifier. This allows each user to maintain a distinct profile with respect to a netpage page server 10 or application server 13.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

1.2 Netpages

Netpages are the foundation on which a netpage network is built. They provide a paper-based user interface to published information and interactive services.

As shown in FIG. 1, a netpage consists of a printed page (or other surface region) invisibly tagged with references to an online description 5 of the page. The online page description 5 is maintained persistently by the netpage page server 10. The page description has a visual description describing the visible layout and content of the page, including text, graphics and images. It also has an input description describing the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier in the form of a page ID (or, more generally, an impression ID). The page ID has sufficient precision to distinguish between a very large number of netpages.

Each reference to the page description 5 is repeatedly encoded in the netpage pattern. Each tag (and/or a collection of contiguous tags) identifies the unique page on which it appears, and thereby indirectly identifies the page description 5. Each tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage reader 400, and the tag data is transmitted to the netpage system via the nearest netpage relay device 601. The reader 400 is wireless and communicates with the netpage relay device 601 via a short-range radio link. It is important that the reader recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description 5 for each printed netpage 1.

1.3 Netpage Tags

Each tag 4, contained in the position-coding pattern 3, identifies an absolute location of that tag within a region of a substrate.

Each interaction with a netpage should also provide a region identity together with the tag location. In a preferred embodiment, the region to which a tag refers coincides with an entire page, and the region ID is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

As described in some of the Applicant's previous applications (e.g. U.S. Pat. No. 6,832,717), the region identity may be encoded discretely in each tag 4. As described other of the Applicant's applications (e.g. U.S. application Ser. Nos. 12/025,746 & 12/025,765 filed on Feb. 5, 2008), the region identity may be encoded by a plurality of contiguous tags in such a way that every interaction with the substrate still identifies the region identity, even if a whole tag is not in the field of view of the sensing device.

Each tag 4 should preferably identify an orientation of the tag relative to the substrate on which the tag is printed. Strictly speaking, each tag 4 identifies an orientation of tag data relative to a grid containing the tag data. However, since the grid is typically oriented in alignment with the substrate, then orientation data read from a tag enables the rotation (yaw) of the netpage reader 400 relative to the grid, and thereby the substrate, to be determined. As explained in Section 3, the netpage reader 400 in the present invention typically takes the form of a swipe printer or swipe scanner.

A tag 4 may also encode one or more flags which relate to the region as a whole or to an individual tag. One or more flag bits may, for example, signal a netpage reader 400 to provide feedback indicative of a function associated with the immediate area of the tag, without the reader having to refer to a corresponding page description 5 for the region. A netpage reader may, for example, illuminate an "active area" LED when positioned in the zone of a hyperlink.

A tag 4 may also encode a digital signature or a fragment thereof. Tags encoding digital signatures (or a part thereof) are useful in applications where it is required to verify a product's authenticity. Such applications are described in, for example, US Publication No. 2007/0108285, the contents of which is herein incorporated by reference. The digital signature may be encoded in such a way that it can be retrieved from every interaction with the substrate. Alternatively, the digital signature may be encoded in such a way that it can be assembled from a random or partial scan of the substrate.

It will, of course, be appreciated that other types of information (e.g. tag size etc) may also be encoded into each tag or a plurality of tags.

For a full description of netpage tags 4, reference is made to the Applicant's previously filed patent applications identified above, the contents of which are herein incorporated by reference.

2. Netpage Printer

Figure 3:
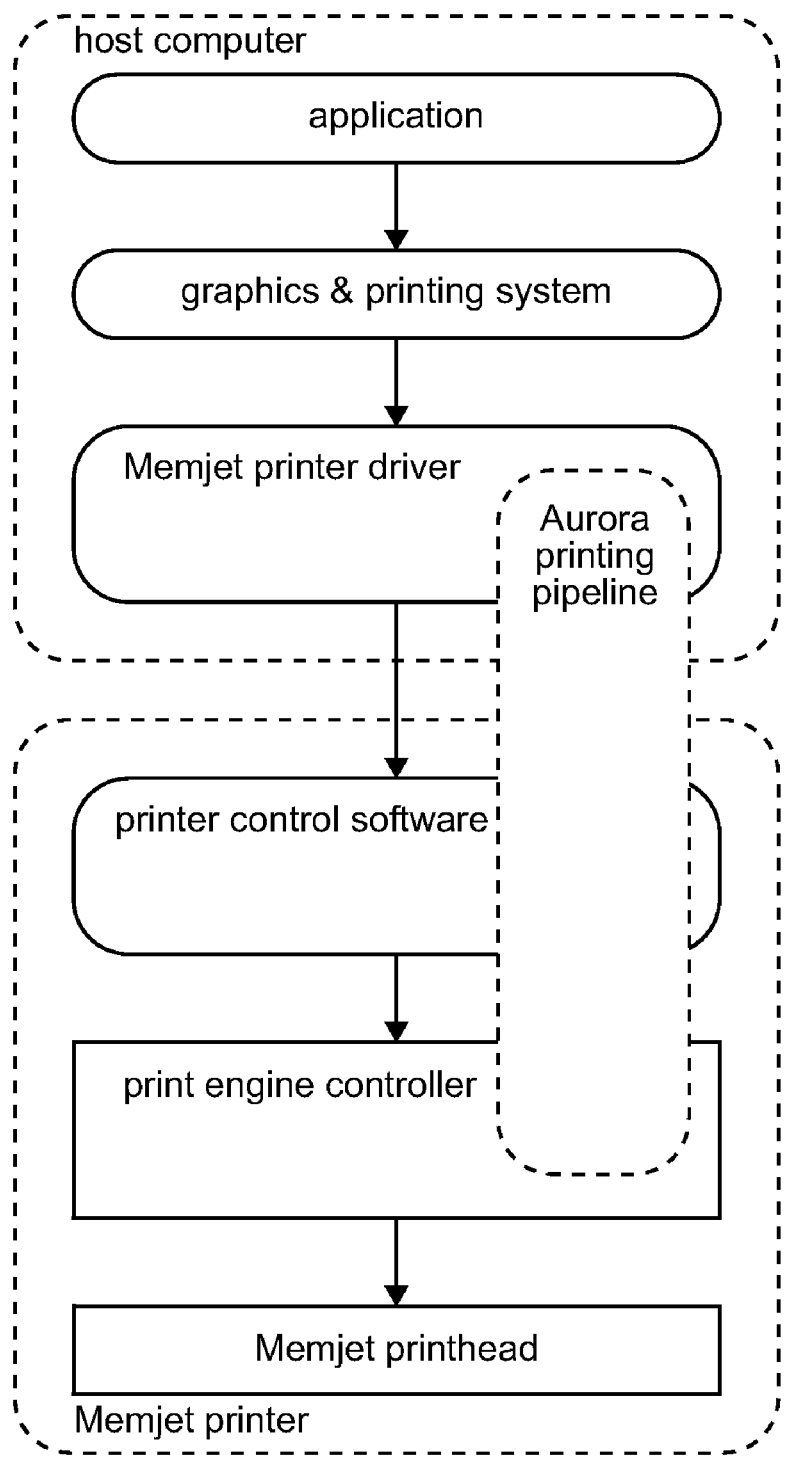
FIG. 3 shows a typical 'Aurora' printing pipeline.

A Memjet printer is a high-speed and high-quality colour printer which utilises a pagewidth Memjet printhead, e.g. as described in U.S. Pat. No. 7,125,185. It is driven by a printing pipeline, dubbed 'Aurora', which supports the rendering and compositing of high-resolution bi-level text and relatively lower-resolution contone colour images as described in U.S. Pat. Nos. 6,665,094 and 7,125,185, the contents of which are herein incorporated by reference. The Aurora pipeline is typically implemented partly in the host printer driver, partly in embedded printer software, and partly in dedicated printer hardware, in a print engine controller ASIC, e.g. as described in U.S. Pat. No. 7,125,185. This is illustrated in FIG. 3. Exact partitioning varies according to printer model.

A Memjet printer is designed to support Netpage printing as a fundamental capability. To this end, the Memjet printhead includes a dedicated row of nozzles for printing Netpage tags (see, for example, U.S. Pat. No. 6,832,717 and U.S. application Ser. Nos. 12/025,746 & 12/025,765 filed on Feb. 5, 2008, the contents of which are herein incorporated by reference), using infrared ink; the print engine controller supports real-time rendering of tags according to a supplied tag format and tag data; and the Aurora pipeline accepts tag information and formats it for a particular hardware configuration.

An example of a Memjet-based Netpage printer is described in U.S. Pat. No. 6,727,996, the contents of which are herein incorporated by reference.

3. Netpage Printing Architecture Requirements

From the point of view of a Memjet printer, an application is something which sends a document to the printer to be printed. From the point of view of a Netpage server, an application is something which sends a document to the server to be archived and possibly printed. A Netpage server is therefore also an application from the point of view of the printer. In the following discussion, we use the term in the Netpage sense.

An application may or may not be Netpage-aware. Every document, whether Netpage-aware or not, benefits from being archived in the Netpage "virtual filing cabinet". In addition, a Netpage-aware document can specify interactive features such as hyperlinks, forms, and dynamic content.

Fundamentally, the involvement of the Netpage server should not compromise the fidelity of the printed output, nor the performance and reliability of the printing operation. This includes respecting job options such as rendering intent, layout (including multi-page), borders and watermarks, and, where possible, media selection.

Printing may be initiated directly by the user interacting with a GUI application. Printing may also be initiated indirectly by the user via the Netpage server or via a non-GUI Netpage application, e.g. in response to the user clicking on a printed Netpage hyperlink. Only in the former case is the user able to explicitly select a target printer and specify job options, although an application may also include logic which allows it to specify a particular printer.

The target printer for a particular printing operation may be a specified printer, a default printer associated with the user, a collection of printers which support walk-up printing, or no printer at all. Default and walk-up printing are particularly useful when printing is initiated indirectly. Printing to the server without physical printing is useful if purely virtual interaction with the document is desired, e.g. via the Netpage Explorer.

The Netpage server may not have access to a particular printer. For example, the printer may be directly connected to a personal computer and may not be shared. Or, even if shared, it may not be configured on the server. When printing is initiated via an application which does have access to the printer, physical printing should therefore not be mediated by the server per se. Equivalently, Netpage functionality should not be restricted to printers directly accessible by the server.

The Netpage server is intended to support clients on a number of platforms, including Windows, MacOS, and Unix. The server itself is also intended to run on multiple platforms. It is therefore a requirement that visual descriptions of documents stored by the server be renderable on any supported platform. However, this requirement conflicts with the requirement that the involvement of the Netpage server not compromise the fidelity of printed output. One possible resolution to this dilemma is to store two versions of visual descriptions where necessary. One version would be platform-dependent and would ensure maximum fidelity when reproduced on the same platform as the originating platform. The other version would be platform-independent and would ensure maximum portability at the expense of a possible small reduction in fidelity. A given server implementation could be optimised to generate the platform-independent version on demand.

4. Netpage Printing Architecture

The following sections describe architectures which support the following use cases:
  printing from the Netpage server directly to a printer
  printing from an application via the Netpage server
  printing from an application directly to a printer
  printing from a Netpage-aware application via the Netpage server
  printing from a Netpage-aware application directly to a printer There is an added dimension to some of these use cases when the document being printed is already known to the Netpage server. This is discussed in a separate section.

In the following, the Aurora printer driver represents a platform-independent place-holder for the various platform-dependent versions of a printer driver that drives the Aurora pipeline and a Memjet printer. On the Windows platform, the Azure printer driver described in Section 5 implements an Aurora printer driver. Although the architecture discussed here is intended to be platform-independent, it is influenced by the architecture of Windows GDI.

4.1 Printing from the Netpage Server

Figure 4:
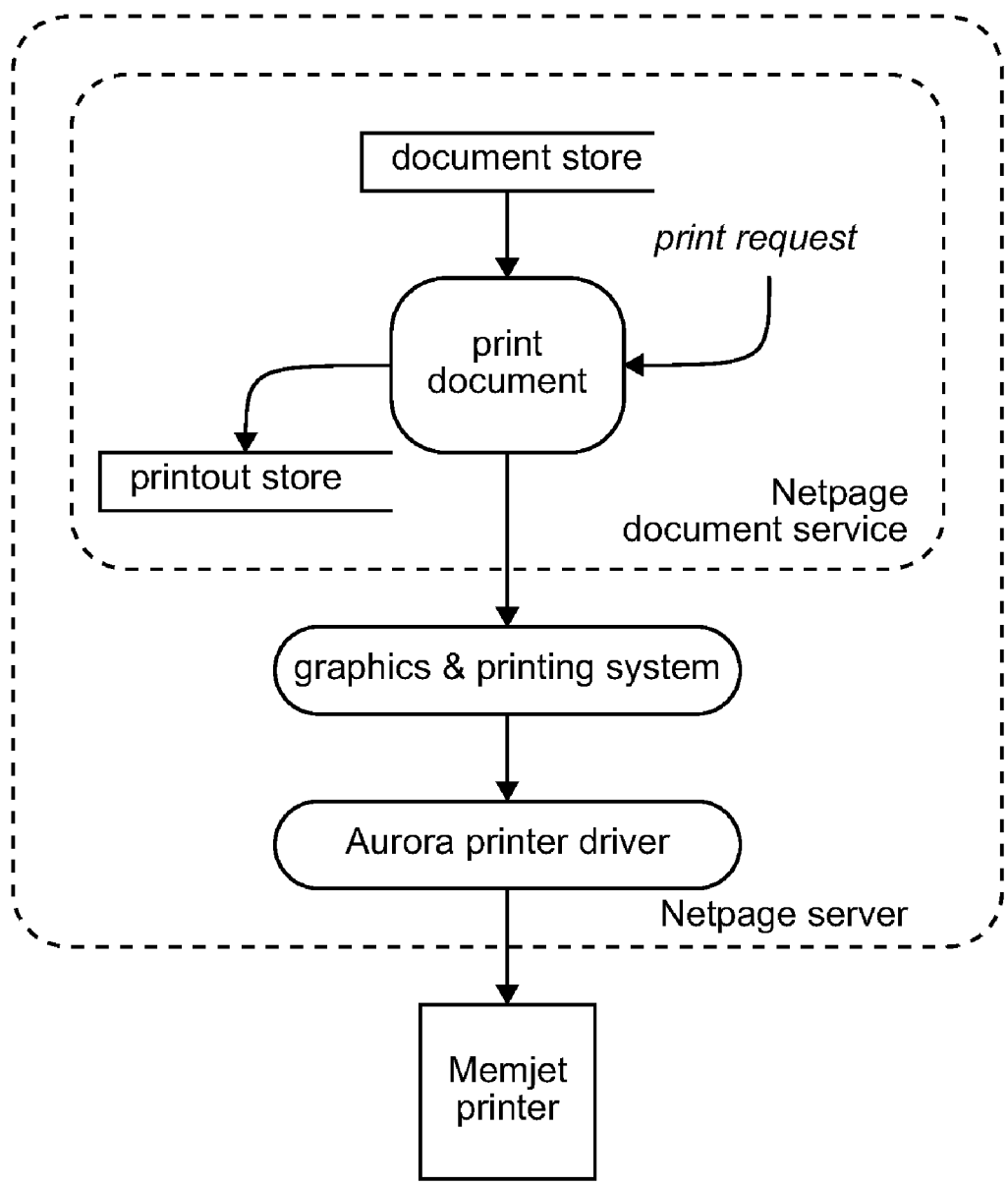
FIG. 4 shows printing from the Netpage document service.

FIG. 4 shows the high-level data flow when printing from the Netpage server to a printer visible to the server.

The Netpage server relies on an Aurora printer driver which supports both graphics rendering and tag rendering.

Figure 5:
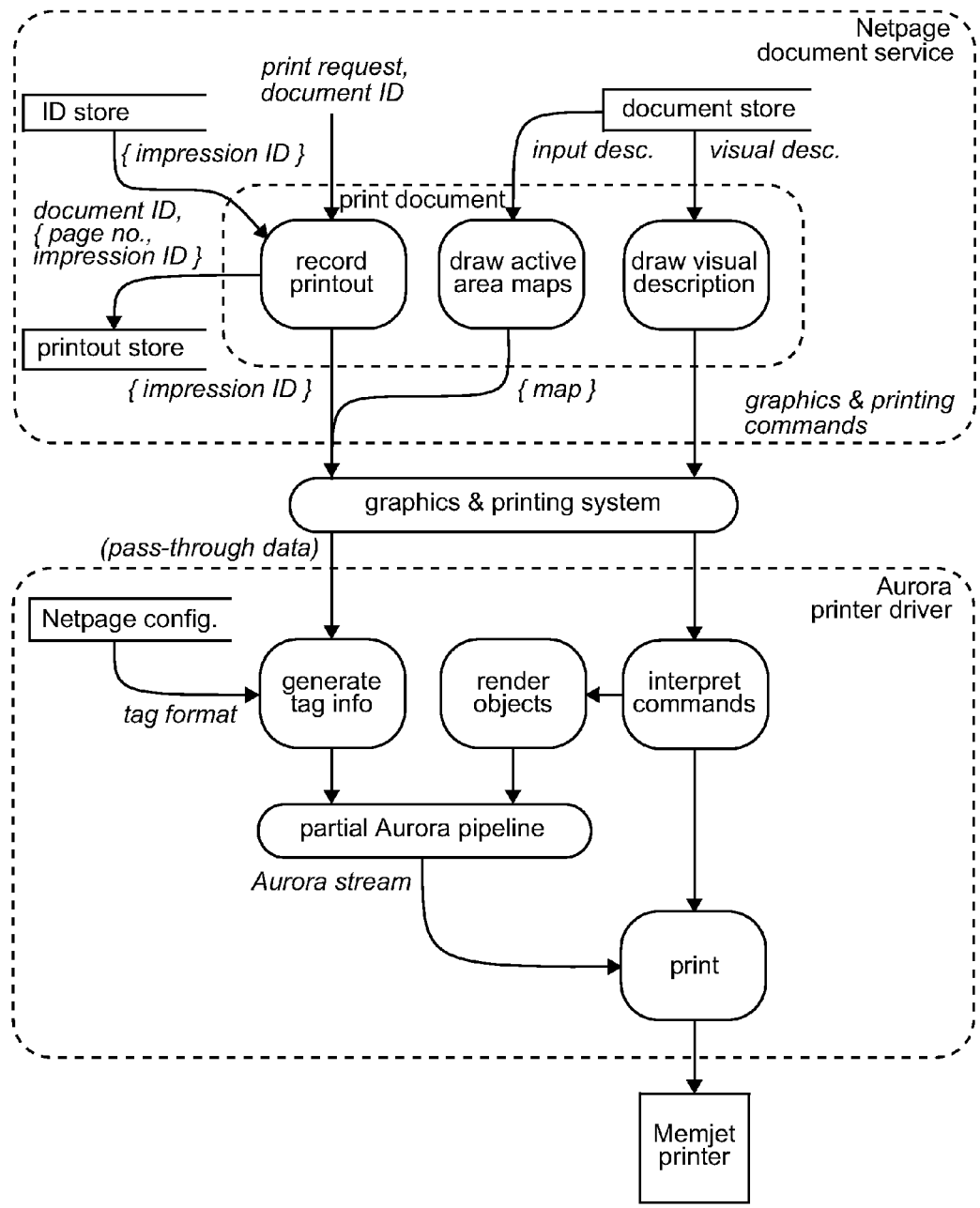
FIG. 5 shows detailed data flow for the printing steps shown in FIG. 4.

FIG. 5 shows the detailed data flow corresponding to FIG. 4. The <print document> process of the document service records the printout in the printout store, draws the active area map of each page, and draws the visual description of each page in the document.

The graphics and printing subsystem of the host operating system provides the API (Application Programming Interface) for rendering and printing the document, and ultimately forwards graphics and printing commands to the Aurora printer driver. The API normally also supports direct delivery of data to the printer driver in pass-through mode. The document service uses this to deliver tag-related data such as impression IDs and active area maps to the printer driver.

In response to receiving graphics commands from the graphics subsystem, the Aurora printer driver renders and composites graphic objects into the Aurora page representation. The driver utilises functions provided by the graphics subsystem to assist with rendering, such as scan-conversion of glyph outlines.

In response to receiving printing commands from the printing subsystem, the printer driver invokes printing functions on the Memjet printer, including sending it print data in the form of Aurora stream data. Communication between the printer driver and the physical printer is typically mediated by the operating system.

In response to receiving tag-related data from the document service, the printer driver generates tag information and includes it in the Aurora page representation. The printer driver retrieves tag format data from the Netpage configuration store. Alternatively, this can be compiled into the driver. Alternatively still, the driver can retrieve such information from the Netpage server, to enhance maintainability.

4.2 Printing from an Application via the Netpage Server

Figure 6:
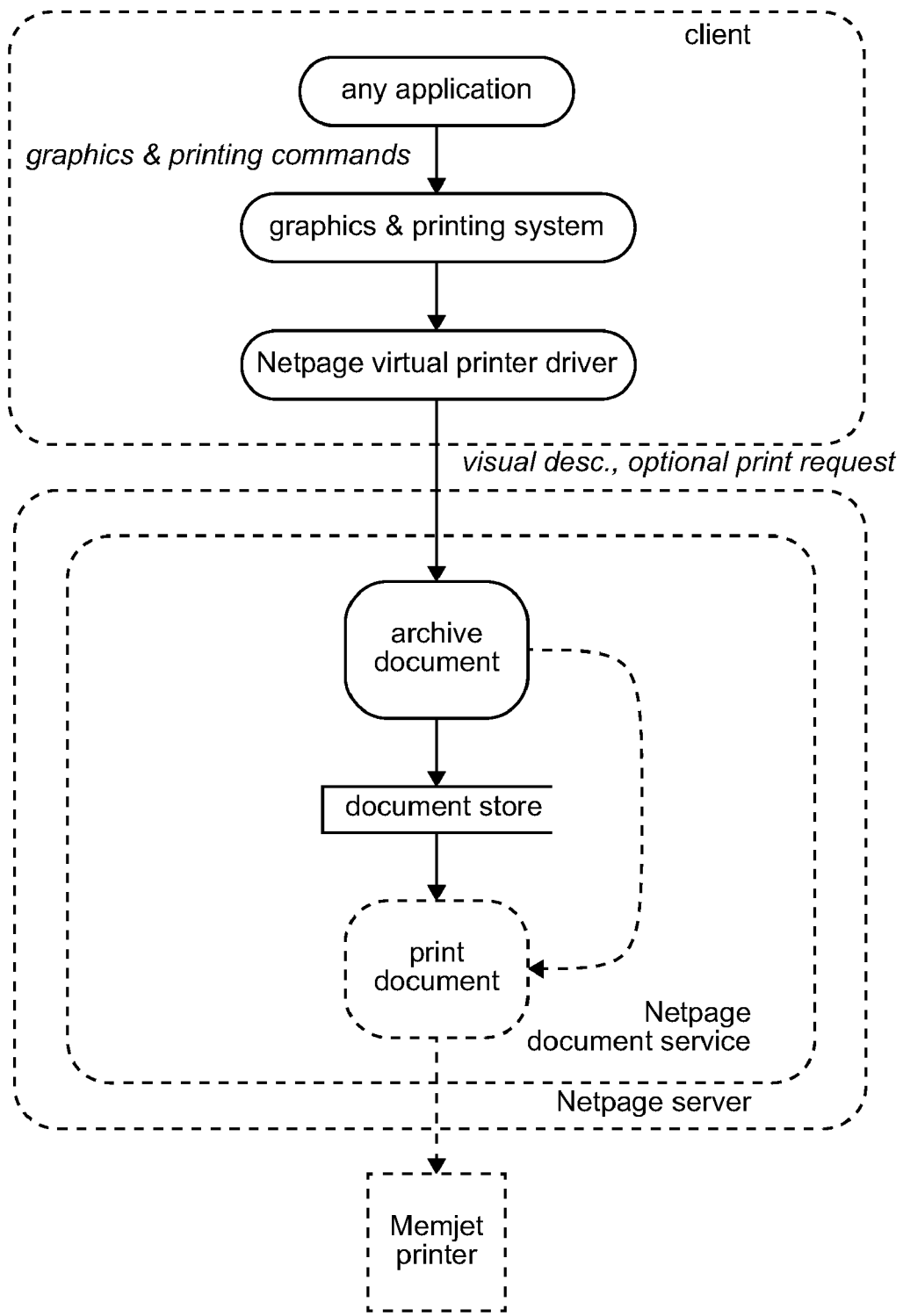
FIG. 6 shows indirect printing from a Netpage-unaware application.

FIG. 6 shows the high-level data flow when printing from a Netpage-unaware application via the Netpage server. Although shown in generic form, the data flow is intended to represent cases where the target printer is variously the user's default printer, a group of walk-up printers, or the null printer. The case of the target printer being a specified printer is covered in the next section.

When physical printing actually takes place, it occurs as described in the previous section.

From the user's point of view, the Netpage server appears as a virtual printer. The user may print to the Netpage server from any application, as to any other printer, whether this results in physical printing or not.

Figure 7:
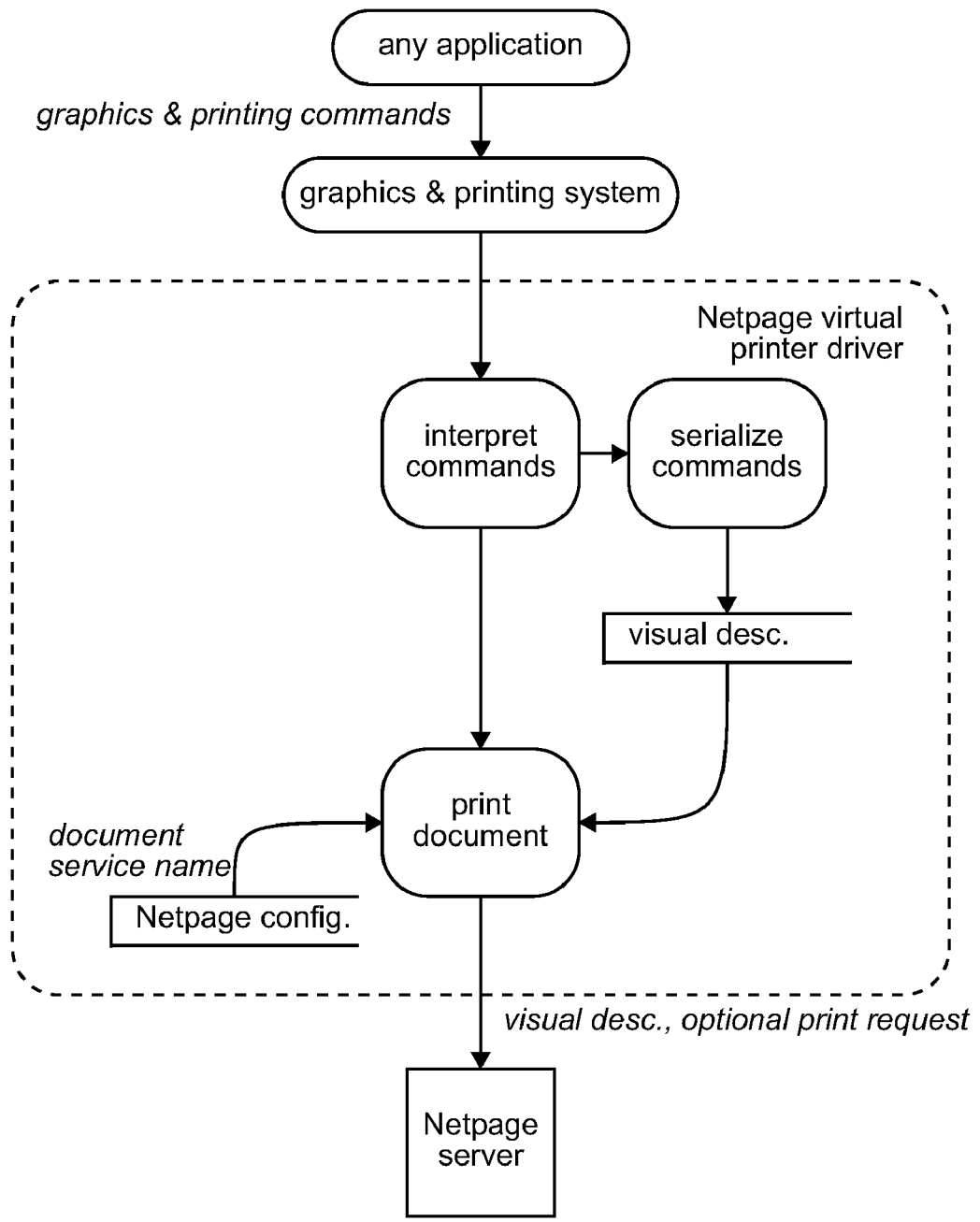
FIG. 7 shows a Netpage virtual printer driver data flow.

FIG. 7 shows the detailed data flow inside the Netpage virtual printer driver of FIG. 6. Again the printer driver receives graphics and printing commands from the graphics and printing subsystem. The commands and associated data are typically in device-independent form, i.e. line art and glyphs are specified in vector form, and colours are specified in a device-independent colour space.

The printer driver serializes the commands to generate a visual description of the document, and subsequently transmits this serialized representation to the Netpage server. It identifies the relevant Netpage document service from the Netpage configuration store. If multiple independent Netpage document services are supported, then the configuration information can be instance-specific. The configuration information can also identify the target printer (e.g. default versus walk-up).

The serialized visual representation can either be platform-dependent (e.g. WMF under Windows GDI), or platform-independent (e.g. PDF). A platform-dependent representation has the advantage that it guarantees the highest possible reproduction fidelity, assuming that the downstream rendering platform is the same. It also has a number of disadvantages: the Netpage server may have to support multiple platform-dependent representations; a complex representation may be difficult to render on a different platform without the availability of helper functions from the original platform; and a complex representation controlled by a third party may evolve and diverge over time.

The serialized representation can be arbitrarily primitive so long as it remains device-independent and doesn't compromise the fidelity of printed output. The Aurora representation itself is too primitive, since its bi-level mask layer has a device-specific resolution.

4.3 Printing from an Application Directly to a Printer

Figure 8:
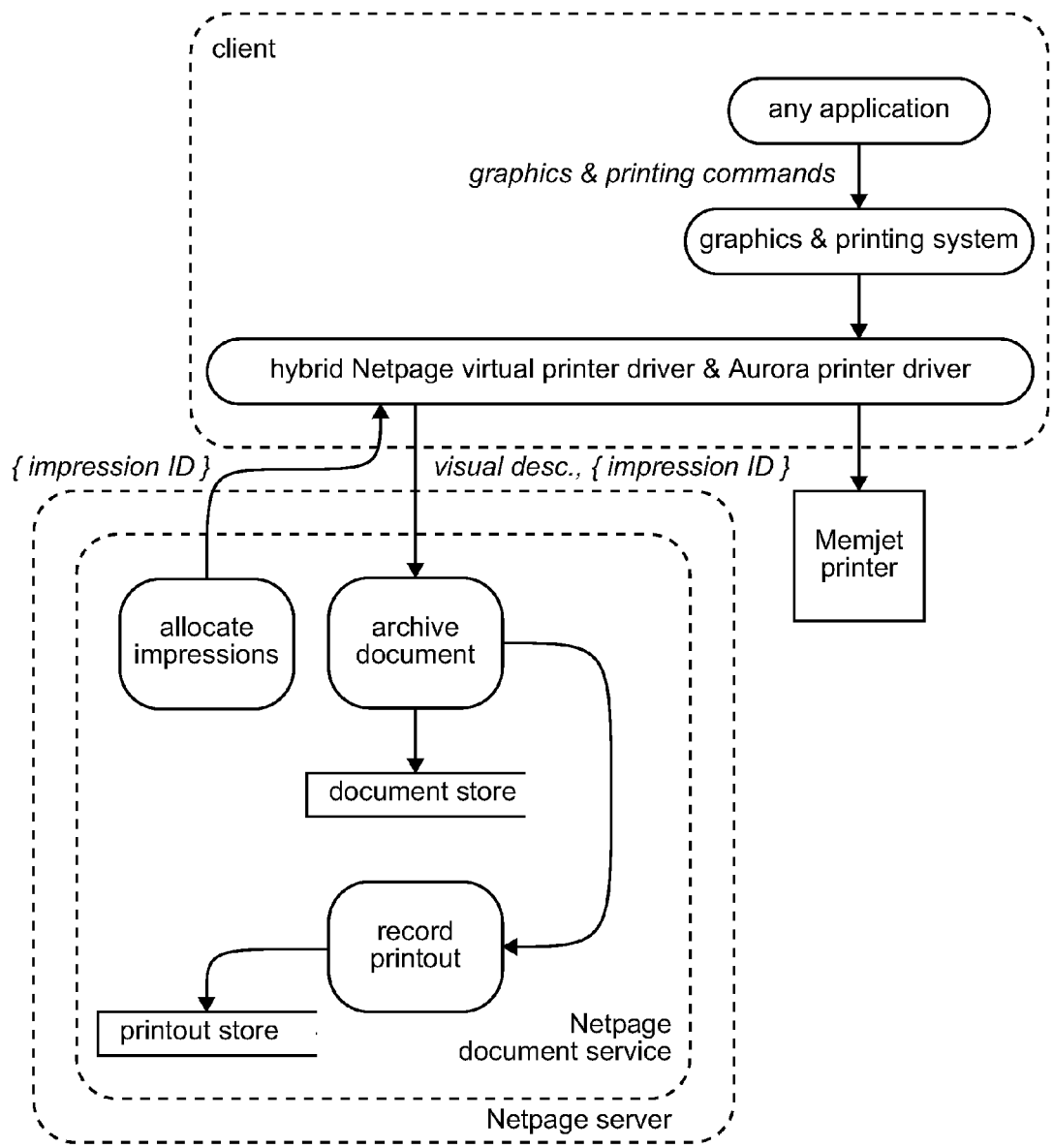
FIG. 8 shows a data flow for direct printing from a Netpage-unaware application.

FIG. 8 shows the high-level data flow when printing from a Netpage-unaware application directly to a printer.

Figure 9:
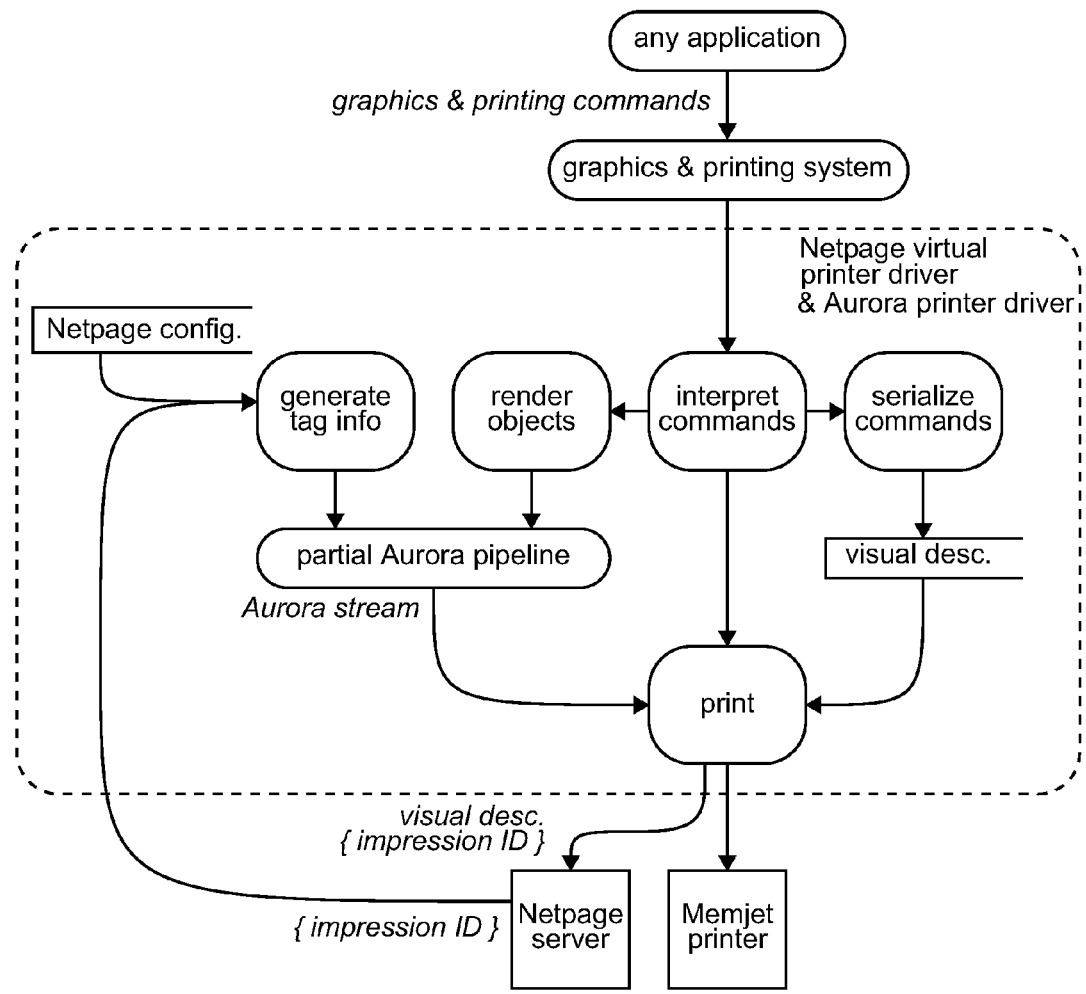
FIG. 9 shows a Netpage virtual printer driver and 'Aurora' printer driver data flow.

In this case the printer driver combines the functions of the Aurora printer driver and the Netpage virtual printer driver described in the previous two sections, as shown in the detailed data flow of FIG. 9.

Unlike the Aurora printer driver described in Section 4.1, the hybrid printer driver does not obtain impression IDs in pass-through mode from the application. Instead, it explicitly requests impression IDs from the Netpage server. The printer driver can obtain a block of impression IDs from the server and allocate them at will; alternatively it can obtain impression IDs on demand. As shown in FIG. 9, the printer driver notifies the Netpage server of the actual impression IDs allocated to the document when it transmits the document's visual description to the server.

4.4 Printing from a Netpage Application via the Netpage Server

Figure 10:
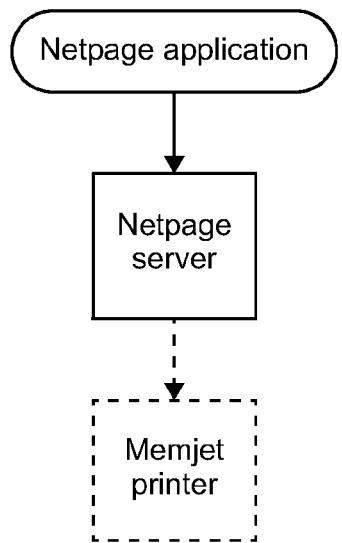
FIG. 10 shows a data flow for indirect printing from a Netpage-aware application.

FIG. 10 shows the high-level data flow when printing from a Netpage-aware application via the Netpage server, using the currently-implemented lodgement and printing interface described in US Publication No. US 2007/0130117, the contents of which are herein incorporated by reference. This does not use the local operating system's printing subsystem.

Figure 11:
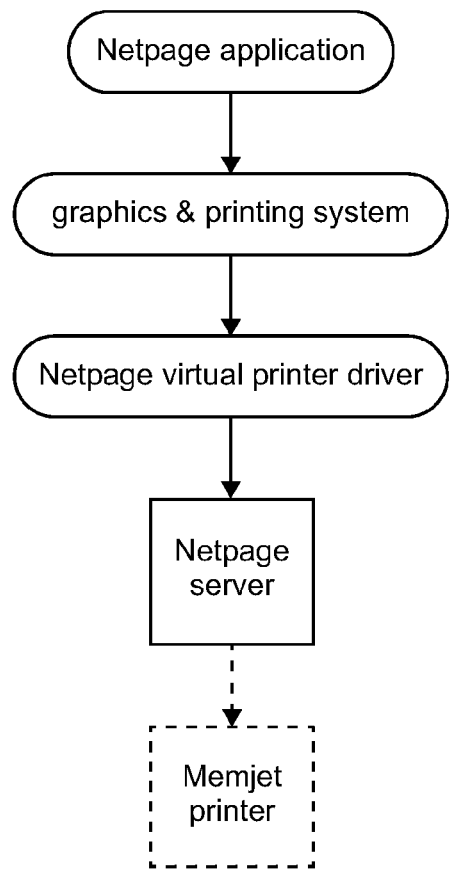
FIG. 11 shows a data flow for indirect printing from a Netpage-aware application, using the Netpage virtual printer driver.

FIG. 11 shows the high-level data flow when printing from a Netpage-aware application via the Netpage server, using an extended version of the Netpage virtual printer driver described in Section 4.2.

This provides a Netpage-aware application with an alternative to directly lodging a document with the server, and may provide a user with a more intuitive lodgement interface. In general, direct lodgement is appropriate for non-GUI applications, while virtual printing is more appropriate to GUI applications.

Figure 12:
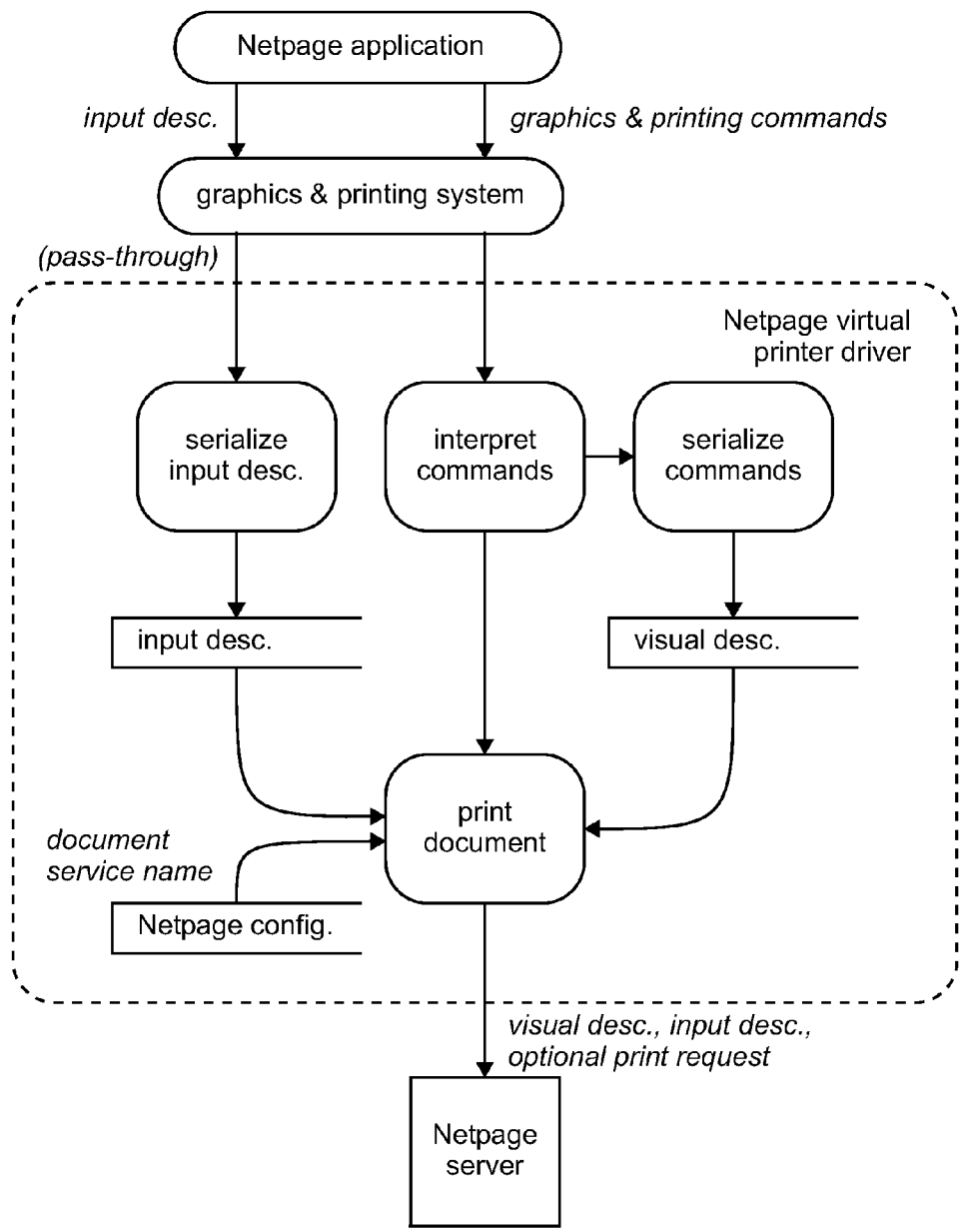
FIG. 12 shows a Netpage virtual printer driver data flow, with support for Netpage input description.

FIG. 12 shows the Netpage virtual printer driver extended with support for receiving a Netpage input description from a Netpage-aware application in pass-through mode.

One of the benefits of 'lodging' via a virtual printer driver is that the user has access to traditional print job options such as page range, n-up and poster printing, borders etc. However, it brings the added complication that the spatial transform applied to the visual description must be identified and applied equally to the input description.

This can be achieved by passing invisible marker elements through the graphics system that can be recognised by the printer driver and used to determine the spatial transform. There needs to be at least one marker per page to support n-up printing, and multiple markers (or one large marker) per page to support poster printing. Markers can be made invisible by bracketing them with escape sequences sent via the pass-through channel. When the printer driver detects the start of the escape sequence it treats subsequent graphics objects as markers, but doesn't render them.

4.5 Printing from a Netpage Application Directly to a Printer

Figure 13:
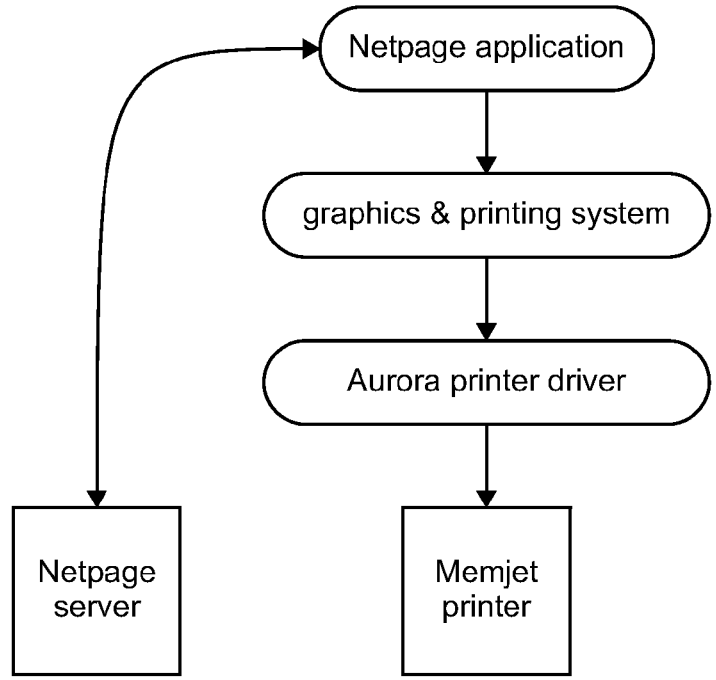
FIG. 13 shows a data flow for direct printing from a Netpage-aware application.

FIG. 13 shows the high-level data flow when printing from a Netpage-aware application directly to a local printer as well as to the Netpage server using the lodgement interface.

In this case the Netpage-aware application implements the functions of the <print document>process described in Section 4.1, and communicates with the Netpage server to obtain impression IDs and lodge the document.

Figure 14:
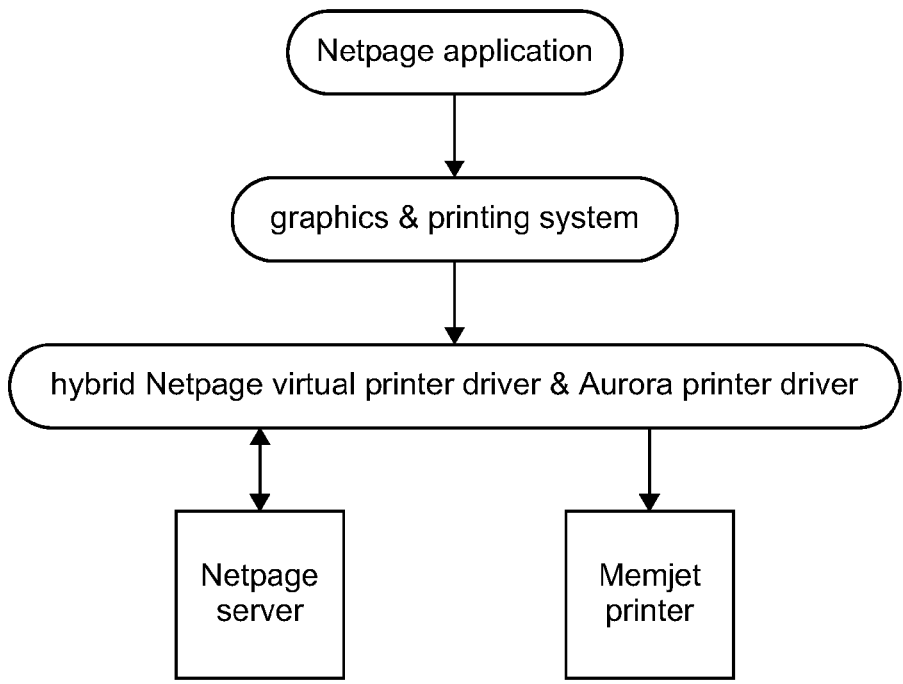
FIG. 14 shows a data flow for direct printing from a Netpage-aware application via the Netpage virtual printer driver.

FIG. 14 shows the high-level data flow when printing from a Netpage-aware application directly to a local printer as well as to the Netpage server using an extended version of the hybrid printer driver described in Section 4.3.

Figure 15:
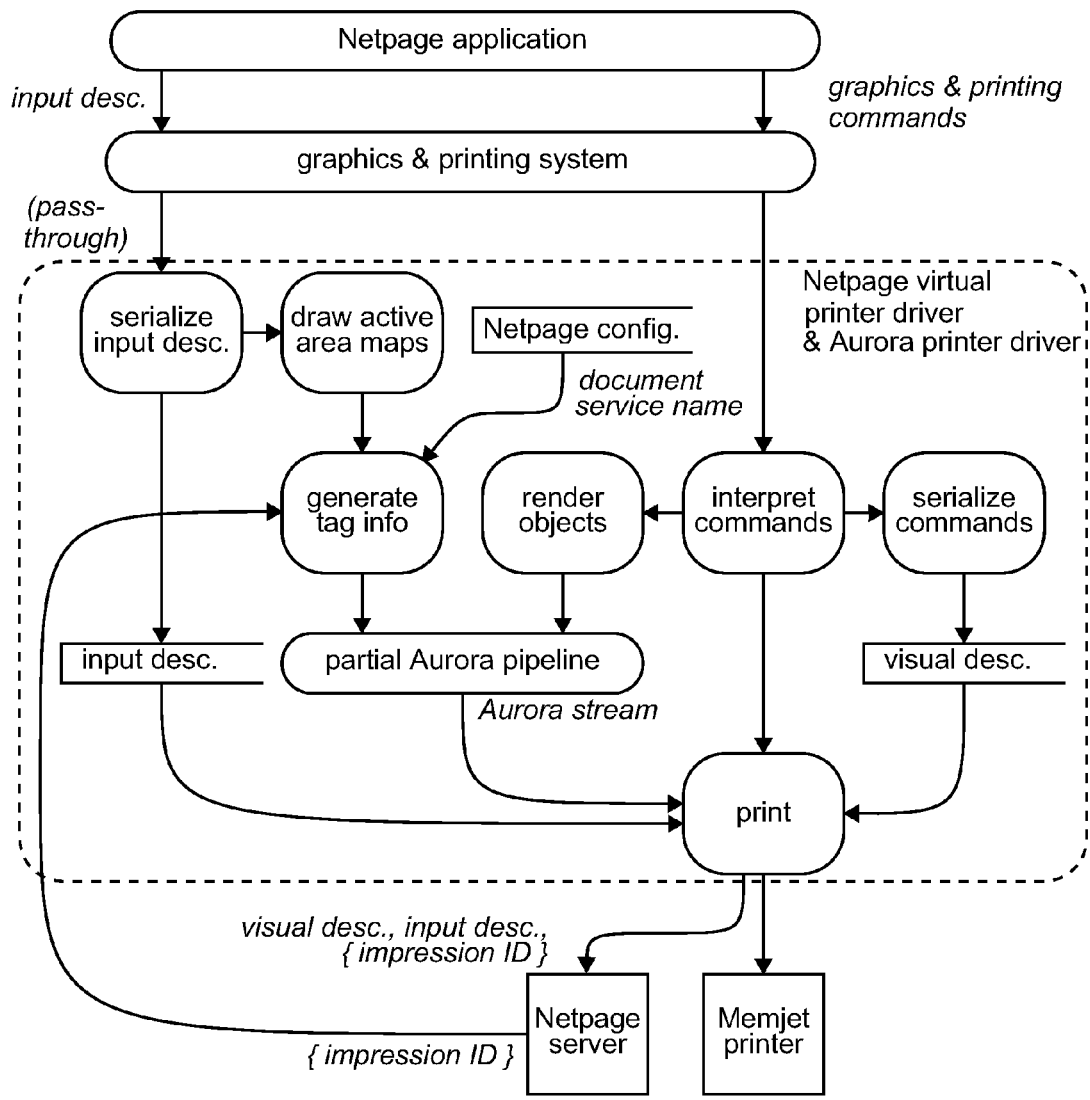
FIG. 15 shows a Netpage virtual printer driver and 'Aurora' printer driver data flow, with support for Netpage input description.

FIG. 15 shows the hybrid printer driver extended with support for receiving a Netpage input description from a Netpage-aware application in pass-through mode. This provides a Netpage-aware application with an alternative to directly lodging a document with the server, and may provide a user with a more intuitive lodgement interface. More particularly, it provides a user with access to the local operating system's user interface for selecting a target printer, and provides a Netpage-aware application with access to private printers not otherwise accessible via the Netpage server.

4.6 Printing a Document Known to the Netpage Server

Under certain circumstances, an application is able to (re-) print a document already known to the Netpage Server. For example, after lodging a document with the server (as described in Section 4.4 and US Publication No. US 2007/0130117), the lodging application has a handle to the document (its document ID) which allows the application to request printing of that document via the server any number of times. As a further example, Netpage Explorer is a Netpage-aware application which provides a user with a view of documents and printouts stored on the server, and allows the user to re-print an existing document or printout, with or without annotations.

It is advantageous, when a user requests a printout of a document, that the printout be linked to the original document rather than to a new document identical to the original document.

When a lodging application requests a (re-)print of a document via the server by supplying a document ID, the server is trivially able to link the resulting printout to the original document. When a user requests a (re-)print of a document or printout via Netpage Explorer's GUI, the print request may be routed via a printer driver, as discussed in Section 4.4 and Section 4.5, and Netpage Explorer will need to supply the document ID or printout ID to the printer driver to pass on to the server, or even to use to retrieve a definitive version of the document. This can be achieved by passing the document ID via the pass-through channel.

Another possibility is to allow the server to discover that a printout is of an existing document by hashing the document description and matching it to the hash of an existing document. This has the advantage that the visual description recorded by the server exactly matches what is actually printed. It has the disadvantage that a slight change in the graphics system may cause the generation of a slightly different serialized visual description, causing a mismatch.

When the Netpage server exposes a file-system view of its documents and printouts, then there is the added complication of users being able to request re-prints of documents via non-Netpage-aware applications. In order to activate the input descriptions of such documents and to allow the server to record the correct parentage of the resulting printouts, the documents can be self-identifying in such a way that the printer driver can identify a document and retrieve the matching input description from the server. This problem can be avoided if the advertised type of documents and printouts exposed via the file system is such that it demands a special Netpage viewer, which in turn can trivially be Netpage-aware and thus correctly identify Netpage documents and printouts.

4.7 Detecting Hyperlink URIs

The output from a Netpage-unaware application may contain text strings that encode hyperlink URIs, e.g. of the form "http://www.example.com". The printer driver or the Netpage server can detect such text strings and generate a corresponding input description allowing such hyperlinks to become active and clickable. Such hyperlinks can also be discovered lazily by the Netpage server, i.e. when the user actually clicks on a location on a page the server can determine if the click coincides with the extent of a text string that is a well-formed URI.

What appears to be a contiguous text string to the eye will sometimes be passed to the printer driver in several fragments. In order to detect a complete URI, it will sometimes be necessary to coalesce spatially adjacent fragments into a single text string. This process can be aided by knowledge of the syntax of a URI.

The printer driver or server can optionally change the visual formatting of the URI text to indicate that it is an active hyperlink (e.g. using a typical blue, underlined visual style). Conversely, the printer driver or server can use the visual formatting of the text to assist in the identification of a hyperlink URI.

5. Netpage Windows Printer Driver

This section describes a Windows GDI hybrid Netpage and Aurora printer driver which supports all of the printing architectures described in Section 4.

5.1 Azure Printer Driver

The Azure printer driver is a Windows GDI driver for Aurora-driven Memjet printers. It includes a number of components, including an interface DLL, a graphics DLL, and an Aurora DLL. The interface DLL provides a common property sheet user interface (CPSUI) which allows the user to specify printing options. The graphics DLL implements a required subset of GDI driver functions, and ultimately invokes Aurora API functions. The Aurora DLL implements the non-embedded parts of the Aurora printing pipeline.

Figure 16:
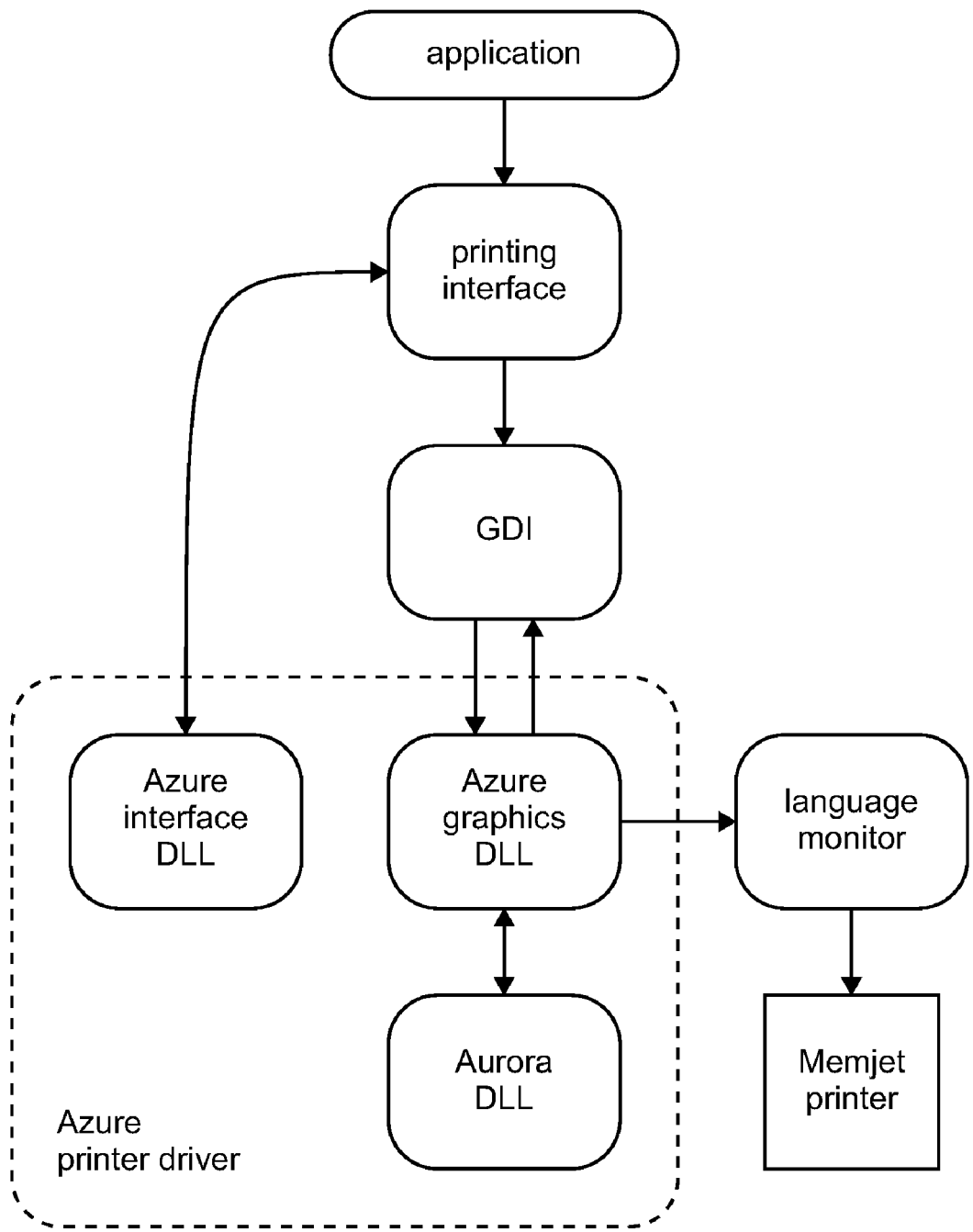
FIG. 16 shows a simplified Windows printing architecture with 'Azure' printer driver.

FIG. 16 shows a simplified view of the Azure printer driver.

The Aurora DLL supports the inclusion of tag information, and the Azure graphics DLL supports the delivery of tag information from a Netpage-aware application to the Aurora DLL, transparently passed through GDI.

5.2 Hybrid Azure Driver with Netpage Support

Figure 17:
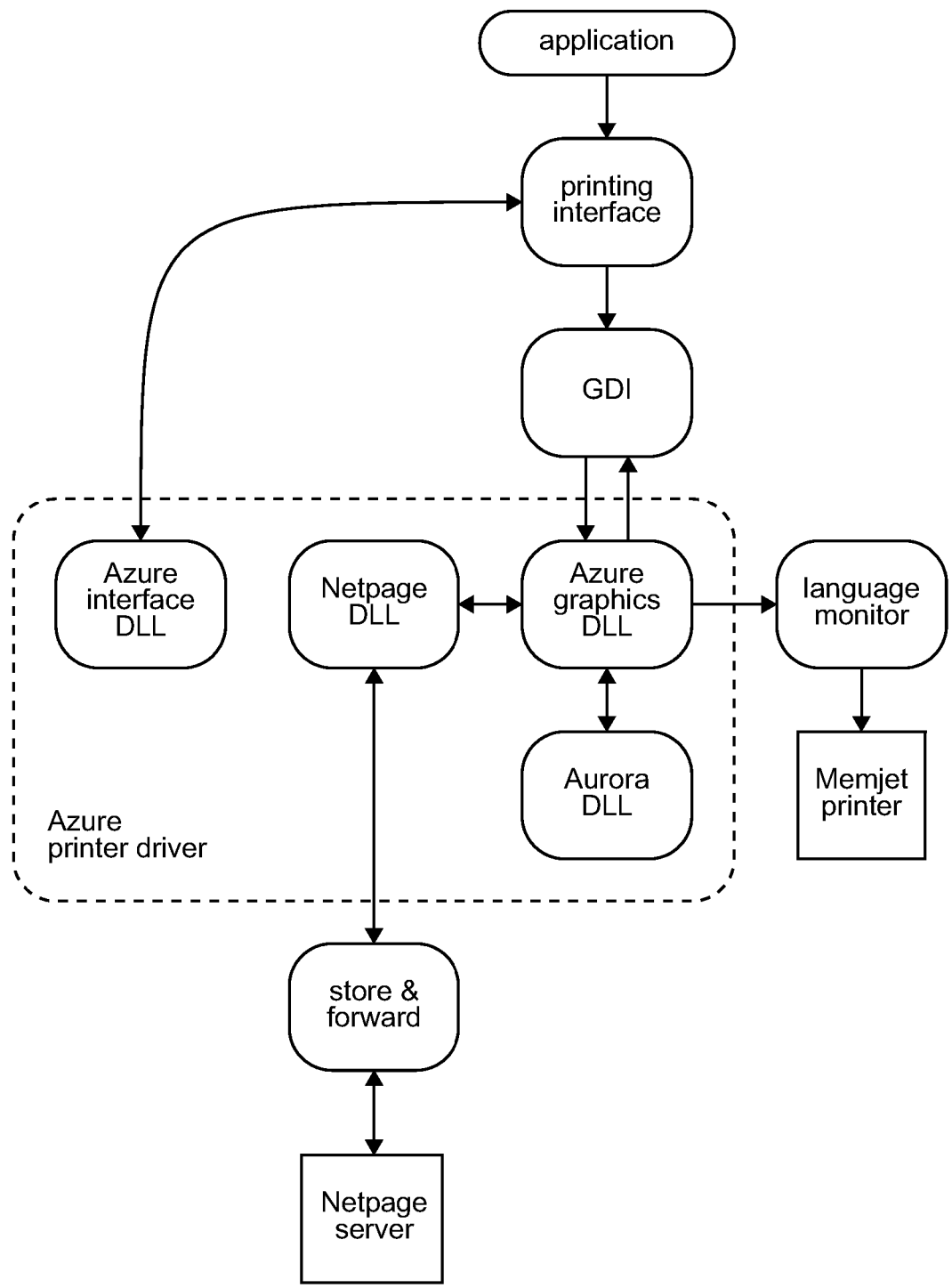
FIG. 17 shows an 'Azure' printer driver with Netpage DLL.

FIG. 17 shows the Azure printer driver augmented with a Netpage DLL.

The Azure graphics DLL invokes the Netpage DLL when a document requires Netpage tags, and the Netpage DLL inserts the requisite tag information into the Aurora stream via the Aurora DLL. This includes tag format data, fixed tag data, and variable tag data. Per-page information such as the impression ID is typically specified partly via fixed tag data and partly via variable tag data. Location-specific information such as x-y location and active area map data is typically specified via variable tag data.

Tag information can alternatively be generated by firmware in the printer itself, based just on impression IDs received from the printer driver (and optionally information about the extent of each active area).

The Netpage DLL can obtain tag format data from the printer information in the Registry, or from the Netpage server (but cached locally). Alternatively this information can be hard-coded in the DLL.

When the Netpage DLL needs to communicate with a Netpage server via a local store & forward service. The store & forward service obtains ranges of impression IDs from the Netpage server and allocates them to the Netpage DLL on request. It stores page descriptions received from the Netpage DLL and forwards them to the Netpage document service when the Netpage document service is available. It obtains the name of the Netpage document service from the printer information in the Registry, and resolves the service name into a network address via a name resolution service (e.g. DNS or Corba Naming Service, depending on implementation).

The Netpage DLL has three tag-generating modes during physical printing, corresponding to the three possible sources of the document being physically printed, and two document-generating modes during virtual printing, corresponding to the two possible sources of the document being virtually printed. Table 1 describes the sources of impression IDs and active area maps during physical printing. Table 2 describes the sources of visual and input descriptions during virtual printing. In total the Netpage DLL therefore has five combined operating modes, corresponding to the five use cases described in Section 4. The implementation of the Netpage DLL similarly follows the descriptions in Section 4.

TABLE 1

Tag generation during physical printing

| application | source of impression IDs | source of active area maps |
| --- | --- | --- |
| Netpage server | passed by server | passed by server |
| Netpage-unaware | obtained from server | n/a |
| Netpage aware | obtained from server | generated from input description |

TABLE 2

Document generation during virtual printing

| application | source of impression IDs | source of active area maps |
| --- | --- | --- |
| Netpage-unaware | generated from GDI calls | n/a |
| Netpage aware | generated from GDI calls | passed by application |

In order to insulate the Netpage DLL from aspects of Netpage which don't directly concern it, the Netpage input description provided by a Netpage-aware application can be encapsulated and simply passed through the Netpage DLL to the Netpage document service. In this case the Netpage DLL needs to be provided with optional active area map information separately, to allow it to generate tag data. Similarly, a Netpage-aware application is provided with an SDK for building a Netpage input description, to insulate it from knowledge of the encapsulated representation, and to free it from having to explicitly generate optional active area maps.

5.3 Netpage Printer Information

A single configurable Azure printer driver implementation is intended to support all Aurora-driven Memjet printers, and this extends naturally to Netpage support.

The Azure printer configuration file can be extended with Netpage-specific entries, such as whether Netpage support is enabled for the printer, which modes are supported, and the default name for the Netpage document service. These can also have hard-coded defaults in the Netpage DLL.

5.4 Netpage User Interface Options

For each physical printer, the user is allowed to enable Netpage tag printing and document archiving both as a default and on a per-job basis. This is made possible via a property on the Advanced CPSUI tab. It may also be made possible via a checkbox on the Layout tab.

The user is also be allowed to identify a Netpage document service by name, again via a property on the Advanced tab.

6. Page Description Languages

A printer driver or printer may support a page description language (PDL) such as Adobe Postscript, Adobe Portable Document Format (PDF), or Hewlett-Packard's Printer Command Language (PCL). When a printer driver exposes PDL support it allows an application to generate page descriptions in a platform-independent manner. When a printer exposes PDL support it allows a host system to generate page descriptions that are compact and therefore efficient to store and transmit to the printer.

PDL support by a printer driver and its printer are somewhat orthogonal. A printer may expose a PDL while its printer driver does not, and a printer driver may expose a PDL but render it to an image format before transmitting it to the printer.

When the printer driver exposes a PDL, the Netpage extension to the printer driver must be capable of serialising the PDL for storage on the Netpage server. This is trivial when the Netpage server natively supports the PDL as a document format. Since the Netpage server natively supports PDF and serialised GDI, a Netpage printer driver extension easily supports Postscript, PDF and PCL.

Some PDLs, including Postscript and PDF, support the definition of hyperlinks and forms. Postscript supports the definition of hyperlinks and forms via the pdfmark operator, which is interpreted when a Postscript file is distilled to a PDF file but is otherwise typically ignored when the Postscript file is printed.

When the PDL exposed by the printer driver supports the definition of hyperlinks and/or forms, the Netpage printer driver extension or the Netpage server can utilise this information to generate a corresponding input description, thus rendering hyperlinks and/or forms active.

In a Windows GDI environment, when a printer driver advertises PDL support an application that chooses to generate PDL rather than utilise GDI simply transmits PDL data to the printer driver graphics DLL via the GDI pass-through channel.

When the printer exposes PDL support, the Netpage printer driver extension must transmit tag information to the printer via the PDL. Minimally, if tag data is generated by the printer firmware, this consists of an impression ID for each page. In the case of Postscript and PDF this can be done via a per-page annotation or document metadata that is interpreted by the printer. In the case of PCL it can be done via a per-page macro that is interpreted by the printer.

7. Printing onto Pre-Tagged Blanks

There are two ways to Netpage-enable a Memjet printer: the printer can be given the capability to print Netpage tags on demand, or the printer can be given the capability to identify pre-tagged blank media.

7.1 Generic Data Flow

Figure 18:
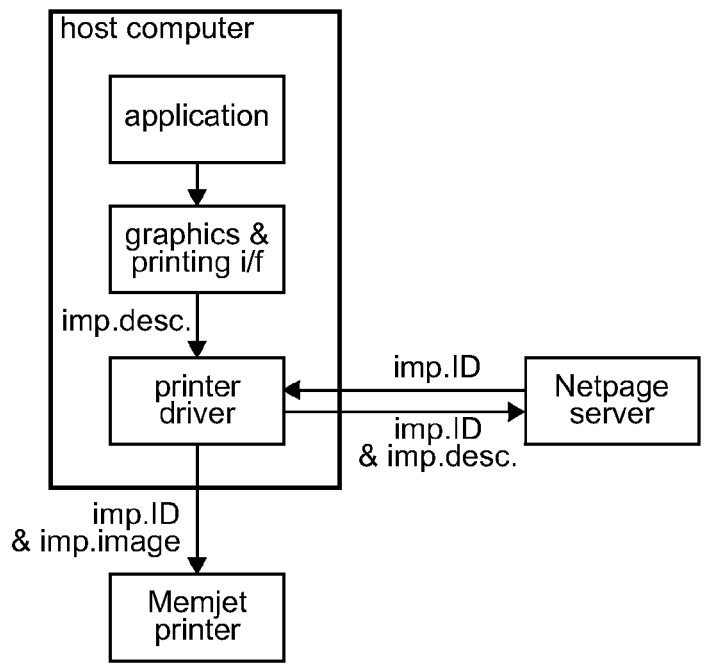
FIG. 18 shows a data flow for printing to a tag-printing Memjet printer.

FIG. 18 shows the flow of data when printing to a tag-printing Memjet printer. The printer driver receives a graphic description of each impression from the graphics system; renders the impression description to produce an impression image; obtains an ID for the impression from the Netpage service; archives the impression description with the Netpage service, indexed by impression ID; and sends both the impression ID and the impression image to the printer for printing.

As described in Section 5.2 (FIG. 17), communication between the printer driver and the Netpage service may be mediated by the Netpage store & forward service to ensure that the printer driver isn't blocked by the unavailability of the Netpage service. The Netpage store & forward service caches blocks of impression IDs for offline allocation, and stores and forwards impression descriptions.

When the printer driver archives an impression description with the Netpage service, it does so in the name of the user who initiated the print. It gains the authority to do so by presenting a ticket to the Netpage service which was previously allocated in the name of the user. The ticket also identifies the Netpage service in systems where multiple Netpage services are supported.

Figure 19:
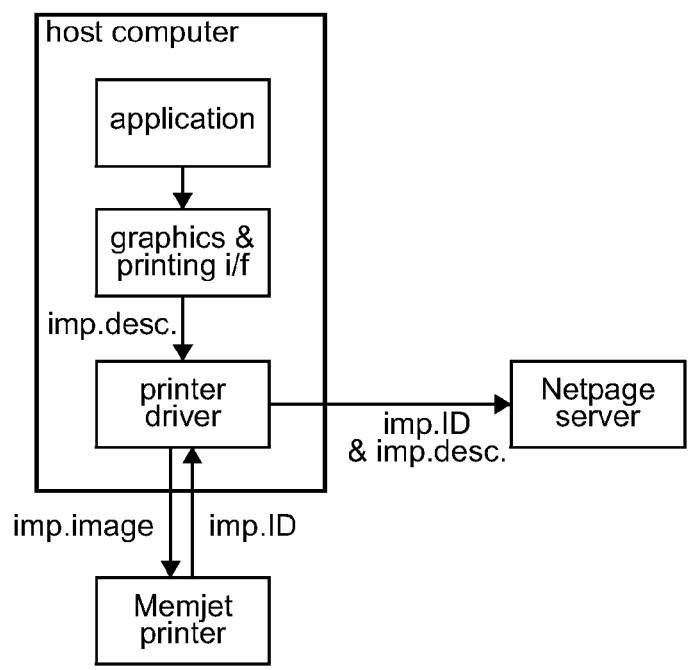
FIG. 19 shows a data flow for printing to a media-identifying Memjet printer.

FIG. 19 shows the flow of data when printing to a media-identifying Memjet printer. Instead of obtaining an impression ID from the Netpage service, the printer driver obtains the impression ID from the printer and reports it to the Netpage service. The printer reads the impression ID from the blank medium as it passes through the printer during printing.

7.2 Windows Data Flow

In a Windows printer driver the rendering of the impression image (by the graphics DLL) is completely decoupled from the transmission of the impression image to the printer (by the language monitor). The graphics DLL and the language monitor may run on different machines, and the impression image may be stored on disk for an indeterminate time before being transmitted to the printer. Furthermore, there is no communication channel from the language monitor back to the graphics DLL.

Figure 20:
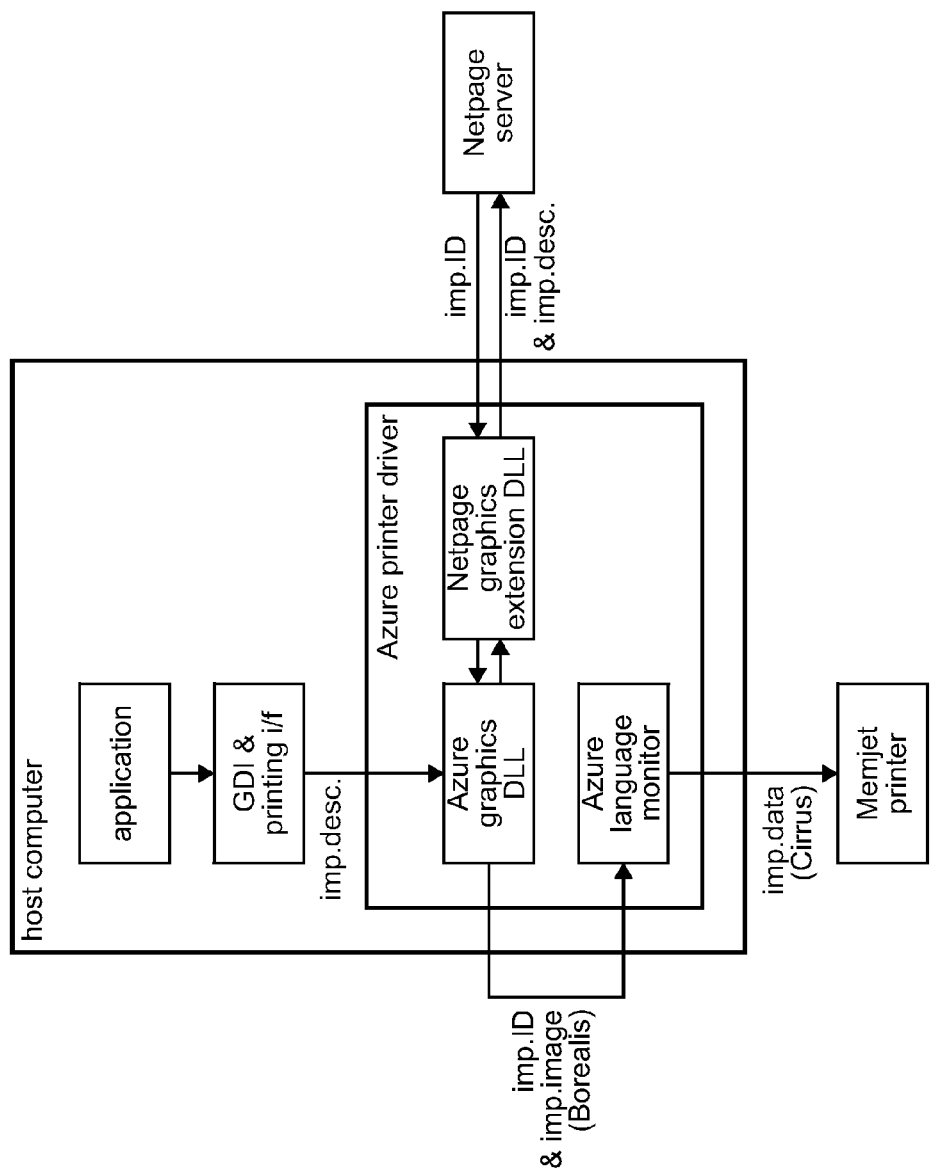
FIG. 20 shows a data flow for printing to a tag-printing Memjet printer under Windows.

FIG. 20 shows the simplified flow of data when printing to a tag-printing Memjet printer using the Azure printer driver under Windows. The data flow is essentially the same as the generic data flow shown in FIG. 18.

The graphic impression description, consisting of the set of GDI commands passed to the Azure graphics DLL, is passed by the Azure graphics DLL to the Netpage graphics extension DLL which serializes the impression description and archives it with the Netpage service. Since it is desirable to archive a device-independent impression description with the Netpage service, it is convenient for the Azure graphics DLL to perform the archiving, rather than at a later stage in the printing pipeline. However, although it is convenient for the Azure graphics DLL to perform the archiving, it is also possible to pass the impression description alongside the impression image to a later pipeline stage for archiving.

The Azure graphics DLL renders the impression description to produce an impression image in the Borealis format, and the Netpage graphics extension DLL allocates the impression ID and generates the Netpage tag data included in the impression image.

Figure 21:
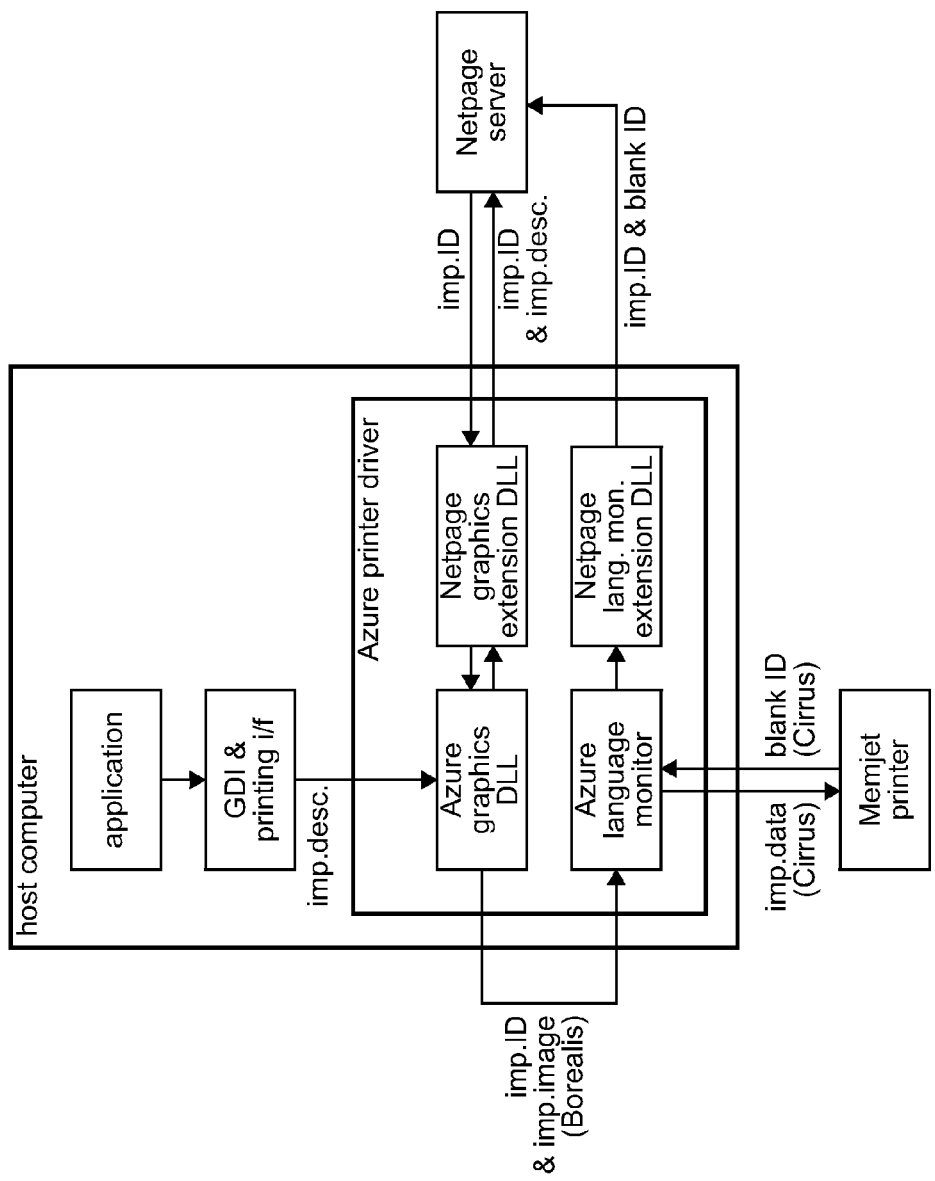
FIG. 21 shows a data flow for printing a media-identifying Memjet printer under Windows.

FIG. 21 shows the simplified flow of data when printing to a media-identifying Memjet printer using the Azure printer driver. Since it is impractical for the Azure graphics DLL to determine the ID of the blank medium onto which the corresponding impression image is eventually printed, the language monitor must inform the Netpage service of the blank ID. This leads to a more complex data flow than the generic data flow shown in FIG. 19.

In order for the Netpage service to associate the blank ID with the appropriate impression description, the language monitor must also identify the impression description to the Netpage service. Since, as discussed above, the Azure graphics DLL is already designed to allocate an impression ID for an impression when printing to a tag-printing Memjet printer, this impression ID provides a convenient basis for the Azure language monitor to identify the impression to the Netpage service.

The Azure language monitor is notified by the Memjet printer of the successful printing of each impression. This provides a convenient trigger for notifying the Netpage service of the blank ID.

The Netpage graphics extension DLL and the Netpage language monitor extension DLL can both communicate with the Netpage service via the Netpage store & forward service.

To allow the graphics DLL to communicate the impression ID to the language monitor, the Borealis format used between the graphics DLL and the language monitor must be enhanced to include an explicit impression ID. In the current Borealis format the impression ID is encoded opaquely in the tag data.

Since the language monitor, like the graphics DLL, submits information to the Netpage service in the name of the user, it must also be able to present the ticket originally allocated for the print job. The Borealis format must therefore be enhanced to allow the graphics DLL to pass the ticket to the language monitor.

To allow the printer to report the blank ID to the language monitor, the Cirrus protocol used between the printer and the language monitor must be enhanced to include a message for reporting the blank ID.

8. Recording Pre-Tagged Printouts

Figure 22:
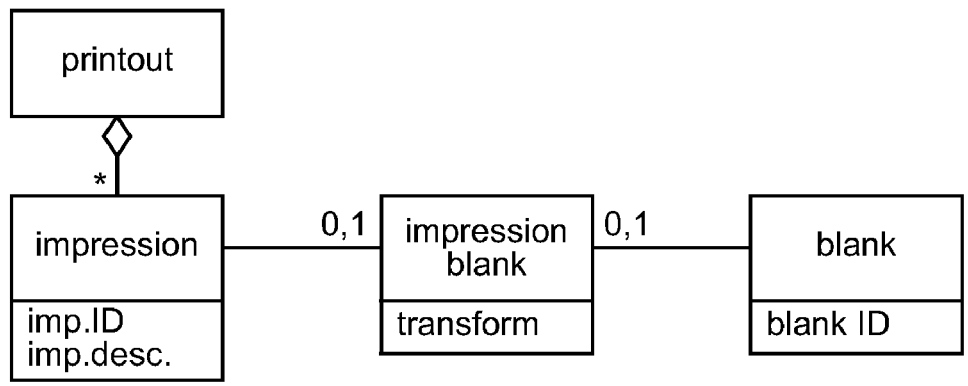
FIG. 22 shows a simplified object model for a printout recorded by the Netpage service.

FIG. 22 shows a simplified object model for a printout recorded by the Netpage service. A printout consists of a sequence of impressions, each identified by an impression ID and containing a graphic description of the impression.

If the impression image was printed by a tag-printing Memjet printer, then the impression ID is the impression ID encoded in the printed tags. If the impression image was printed by a media-identifying Memjet printer, then the ID encoded in the tags (i.e. the 'physical impression ID') is a blank ID, and the Netpage service can use an impression-blank record to link the blank and the impression. Alternatively, the Netpage service can simply replace the impression ID in the impression record with the blank ID once the blank ID is known.

When the printer prints an impression image onto a blank, there may be misregistration between the printed impression image and the printed tags. In the extreme case the blank may have been fed into the printer backwards, resulting in a 180-degree rotation between the tags and the impression image. The Netpage service can record any such misregistration as a transform in the impression-blank record, and use the transform to correct any digital ink captured via the blank.

9. Identifying Pre-Tagged Blanks

A Memjet printer can identify a pre-tagged blank either by extracting its ID from the Netpage tag pattern printed on the blank, or by extracting its ID from a simpler optical encoding printed on the blank, such as a linear data track (see US Patent Publication No. 2005/0200638, the contents of which is herein incorporated by reference).

A data track reader is a lower cost hardware solution than a Netpage tag sensor, but a data track requires additional real estate on the blank medium. This may be particularly onerous if double-sided printing is supported, i.e. with Netpage tags pre-printed on both sides of the blank. A data track also doesn't allow the lateral registration of the tag pattern to be determined during printing, nor the orientation of the tag pattern (unless there are multiple data tracks).

If a data track is used, then it is preferably printed using the same infrared ink as the Netpage tag pattern to make it unobtrusive, particularly if double-sided printing is supported.

9.1 Using a Linear Encoder to Read the Blank ID

Using a linear encoder to read a data track during printing is discussed in US Patent Publication No. 2005/0200638.

Figure 23:
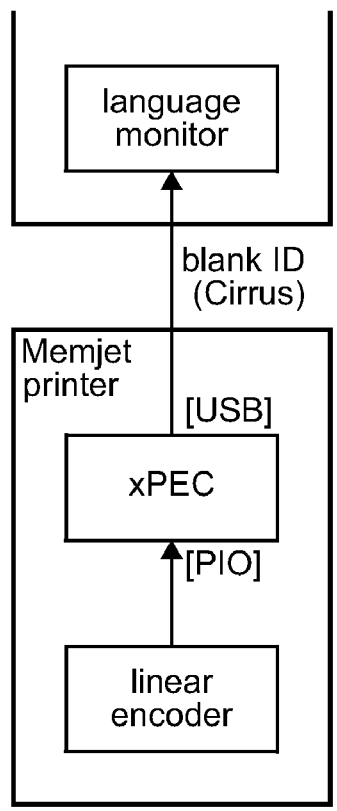
FIG. 23 shows a linear encoder for reading a blank ID.

FIG. 23 shows a linear encoder for reading the data track, connected via a PIO to xPEC. Software on xPEC timestamps and records each data track transition detected by the encoder as the blank medium is transported past the encoder during printing. The clock track can be self-clocked or clocked by a separate clock, in which case a second linear encoder for the clock is also required. Self-clocking implies a halving of the data rate.

Software on xPEC decodes the data track, extracts the blank ID, and transmits the blank ID to the language monitor on the host. Alternatively, xPEC passes the raw data track signal to the host for decoding.

If the longitudinal registration of the printed impression image with the tag pattern is of interest, then the decoding software can correlate the reading of the data track with the printing of the impression image and report the longitudinal registration to the language monitor alongside the blank ID.

If the orientation of the blank medium is of interest, and there are multiple data tracks present on the medium, then the software can also report the orientation indicator extracted from the data track.

9.2 Using a Netpage Tag Sensor to Read the Blank ID

Using a Netpage tag sensor to read the ID from the Netpage tag pattern before or during printing is discussed in US Patent Publication No. 2005/0200638.. The tag sensor consists of an image sensor, a processor, and optionally a communications interface module.

Figure 24:
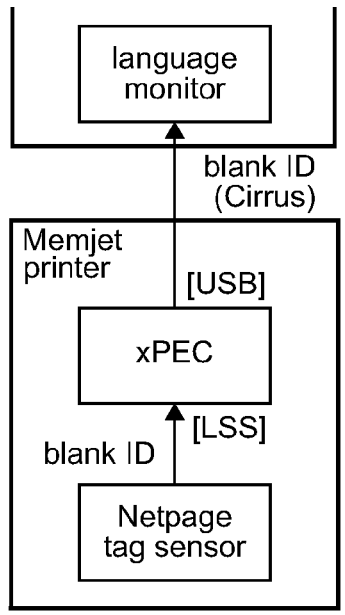
FIG. 24 shows a Netpage tag sensor for reading a blank ID.

FIG. 24 shows a Netpage tag sensor connected via LSS to xPEC. The tag sensor images the Netpage tag pattern of the blank medium, either as the medium is transported past the tag sensor, or as the medium sits in front of the tag sensor (e.g. in the input tray), and decodes the tag image to extract the ID.

The tag sensor can be configured to read tags at regular intervals and notify xPEC every time the ID changes. Alternatively, the tag sensor can be triggered by xPEC to read tags at a particular time, e.g. relative to the printing process, and can then additionally report position (and orientation) information to allow xPEC to report registration information to the language monitor.

Figure 25:
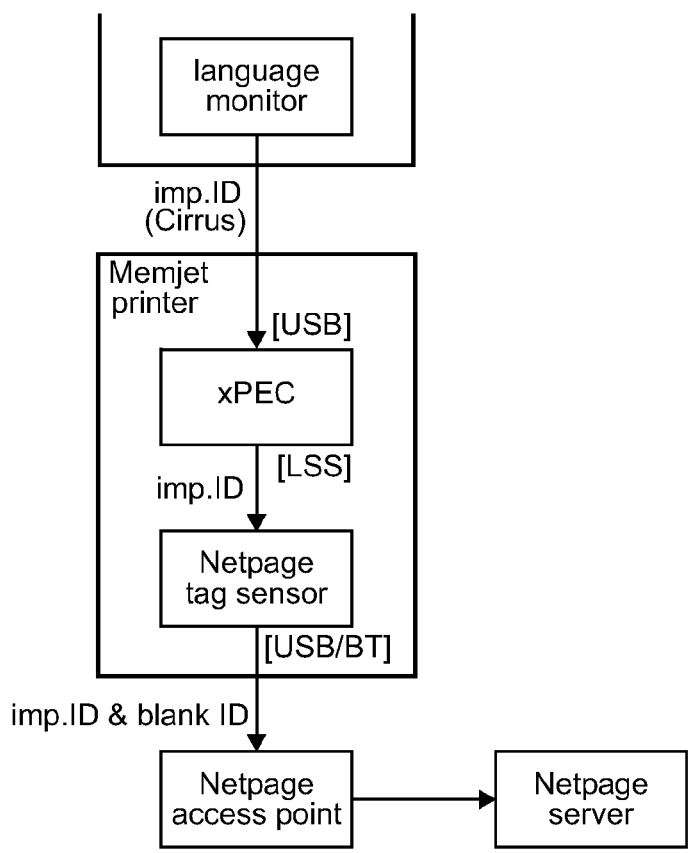
FIG. 25 shows a Netpage tag sensor configured to report a blank ID directly to the Netpage service.

FIG. 25 shows a Netpage tag sensor configured to report the blank ID (and registration information) directly to the Netpage service rather than via xPEC and the language monitor. The tag sensor can communicate with the Netpage service in the same way as other Netpage input devices, such as via a USB, Bluetooth or other wireless connection to a Netpage access point.

The access point can be hosted on the same computer as the language monitor, or can be hosted separately. If the access point is hosted on the same computer as the language monitor, then the tag sensor and xPEC can be connected to the same USB port on the host via a USB hub internal to the printer.

9.3 Allocating Impression IDs in the Printer

As described in US Publication No. 2005/0052661, the contents of which is herein incorporated by reference, when a printer is capable of printing Netpage tags it is possible for the printer to obtain impression IDs from the ink cartridge, the printhead cartridge, or from non-volatile storage in the printer itself When the printer is capable of autonomously allocating impression IDs in this way, it requires the same support from the printing system for reporting actual impression IDs printed as a printer that prints onto pre-tagged blanks. The mechanisms described herein therefore apply equally to printers that autonomously allocate impression IDs.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A computer system for printing a page at a printer, wherein said computer system is configured to:
   receive a visual description for said page, said visual description describing a graphic impression for printing;
   identify a URI text string in the visual description;
   determine from the visual description a spatial extent of the URI text string on the page:
   generate a corresponding input description for said visual description, said input description describing a URI corresponding to the URI text string and the spatial extent of the URI text string on the page;
   print the graphic impression on the page, the graphic impression being superimposed over a position-coding pattern encoding a plurality of locations on said page; and
   archive the visual description and the corresponding input description, the URI being retrievable upon sensing the position-coding pattern within said spatial extent of the URI text string on the page.

2. The computer system of claim 1, wherein said visual description and said input description are archived on a server.

3. The computer system of claim 1, wherein the position-coding pattern further encodes an impression identity.

4. The computer system of claim 3, wherein the visual description and input description are indexed by the impression identity.

5. The computer system of claim 1, which is configured to alter the visual description of the URI text string when the URI text string is identified as a URI.

6. The computer system of claim 1, which is selected from the group comprising:
   a printer driver;
   a server; and
   a server in communication with a printer driver running on a client.

7. A method of printing a page at a printer, said method comprising the steps of:
   receiving a visual description for said page, said visual description describing a graphic impression for printing;
   identifying a URI text string in the visual description;
   determining from the visual description a spatial extent of the URI text string,on the page;
   generating a corresponding input description for said visual description, said input description describing the URI text string and the spatial extent of the URI text string on the page;
   archiving the visual description and the corresponding input description; and
   printing the graphic impression on the page,
   said graphic impression being superimposed with a position-coding pattern on the page, the position-coding pattern encoding a plurality of locations on said page, wherein the URI is retrievable upon sensing the position-coding pattern within said spatial extent of the URI text string on the page.

8. The method of claim 7, wherein said position-coding pattern is pre-printed on the page.

9. The method of claim 7, wherein said position-coding pattern is printed by the printer substantially simultaneously with said graphic impression.

10. The method of claim 8, wherein said position-coding pattern further encodes an impression identity.

11. The method of claim 10, wherein said visual description and said input description are indexed by said impression identity.

12. The method of claim 11, wherein said visual description and said input description are archived on a server.

13. The method of claim 1, further comprising the step of altering the visual description of the URI text string when the URI text string is identified as a URI.

* * * * *